US012459414B2

(12) United States Patent
Nicola et al.

(10) Patent No.: US 12,459,414 B2
(45) Date of Patent: Nov. 4, 2025

(54) INTERACTIVE ADJUSTABLE SEAT WITH MULTIPLE MODES OF OPERATION

(71) Applicant: Leggett & Platt Canada Co., Halifax (CA)

(72) Inventors: Stefano Nicola, Windsor (CA); Laura Romesburg, Spring Lake, MI (US); Katherine Arthurs, Windsor (CA); Maxime Samain, Harelbeke (BE); Renato Colja, Windsor (CA); Kaushik Ray, Windsor (CA)

(73) Assignee: LEGGETT & PLATT CANADA CO., Halifax (CA)

( * ) Notice: Subject to any disclaimer, the term of this patent is extended or adjusted under 35 U.S.C. 154(b) by 99 days.

(21) Appl. No.: 18/165,800

(22) Filed: Feb. 7, 2023

(65) Prior Publication Data

US 2023/0249599 A1    Aug. 10, 2023

Related U.S. Application Data

(60) Provisional application No. 63/307,486, filed on Feb. 7, 2022.

(51) Int. Cl.
*B60N 2/90* (2018.01)
*B60N 2/02* (2006.01)

(52) U.S. Cl.
CPC .......... *B60N 2/914* (2018.02); *B60N 2/0248* (2013.01); *B60N 2/0268* (2023.08)

(58) Field of Classification Search
CPC .......... B60N 2220/20; B60N 2210/40; B60N 2/914; B60N 2/0268; B60N 2/0022; B60N 2/0035
See application file for complete search history.

(56) References Cited

U.S. PATENT DOCUMENTS 6,055,473 A   4/2000  Zwolinski et al.
6,088,642 A   7/2000  Finkelstein et al.
(Continued)

FOREIGN PATENT DOCUMENTS

DE   102019115348 A1   12/2020
EP       4215412 A1    7/2023
(Continued)

OTHER PUBLICATIONS

International Search Report and Written Opinion for Application No. PCT/CA2023/050156, dated Mar. 31, 2023 (14 pages).
(Continued)

*Primary Examiner* — Shin H Kim
(74) *Attorney, Agent, or Firm* — Michael Best & Friedrich LLP

(57) ABSTRACT

Systems and methods for automatic seat adjustment, the systems and methods including a seat frame, a plurality of seat cushions coupled to the seat frame, a plurality of adjustable bladders enclosed within the plurality of seat cushions, and a plurality of sensors enclosed within the plurality of seat cushions. The systems and methods also including a memory for storing user data and a plurality of seat adjustment programs for controlling the at least one of the plurality of adjustable bladders. The systems and methods further including at least one controller coupled to the memory, the plurality of adjustable bladders, and the plurality of sensors, the at least one controller configured to modify at least one of the plurality of adjustable bladders based on feedback from at least one of the plurality of sensors, the user data, and the seat adjustable programs.

15 Claims, 20 Drawing Sheets

(56) References Cited

U.S. PATENT DOCUMENTS

| | | |
|---|---|---|
| 8,668,045 B2 | 3/2014 | Cohen |
| 10,363,846 B2 | 7/2019 | Gallagher et al. |
| 10,532,682 B2 | 1/2020 | Kono |
| 10,940,872 B2 * | 3/2021 | Alexiou .................. G06F 3/016 |
| 10,960,804 B2 | 3/2021 | Fujita et al. |
| 11,135,946 B2 * | 10/2021 | Lodhia ................. A47C 31/126 |
| 11,135,950 B2 | 10/2021 | Migneco et al. |
| 11,288,965 B2 | 3/2022 | Fukuda et al. |
| 11,312,277 B2 | 4/2022 | Bennis et al. |
| 11,548,411 B2 * | 1/2023 | Lodhia ................. A47C 31/126 |
| 11,673,498 B2 | 6/2023 | Bennis |
| 2012/0086249 A1 | 4/2012 | Hotary et al. |
| 2015/0351692 A1 | 12/2015 | Pereny et al. |
| 2016/0129920 A1 | 5/2016 | Hall et al. |
| 2017/0086588 A1 | 3/2017 | Patrick et al. |
| 2018/0156629 A1 | 6/2018 | Lem et al. |
| 2018/0170230 A1 | 6/2018 | Onuma et al. |
| 2019/0300020 A1 * | 10/2019 | Alexiou ................ B60N 2/5891 |
| 2019/0351787 A1 | 11/2019 | Lodhia et al. |
| 2020/0383610 A1 | 12/2020 | Abe et al. |
| 2022/0332235 A1 | 10/2022 | Bennis et al. |
| 2022/0340063 A1 | 10/2022 | Soltner et al. |
| 2022/0410779 A1 | 12/2022 | Bennis |
| 2022/0410780 A1 | 12/2022 | Bennis et al. |

FOREIGN PATENT DOCUMENTS

| | | |
|---|---|---|
| JP | 2021145983 A | 9/2021 |
| WO | 2020009112 A1 | 1/2020 |

OTHER PUBLICATIONS

Japanese Patent Office Action for Application No. 2024547097 dated Jun. 18, 2025 (11 pages including English machine translation).

* cited by examiner

HRV & Stress

Music Massage

Simon Says

Dance Game

INTERACTIVE ADJUSTABLE SEAT WITH MULTIPLE MODES OF OPERATION

BACKGROUND OF THE INVENTION

The present application is related to and claims priority to U.S. Provisional Patent Application Ser. No. 63/307,486, filed Feb. 7, 2022, titled "INTERACTIVE ADJUSTABLE SEAT WITH MULTIPLE MODES OF OPERATION", the entire contents of which being incorporated herein by reference.

Seating for automobiles and similar vehicles has evolved over time. Improvements to seating have been made in the areas of occupant safety, comfort, and convenience. Traditionally, seats include a frame for mounting a seat to the vehicle and have padding and seat covers. More recently, vehicles seats have incorporated powered adjustable positioning, lumbar support, and heating and cooling. However, most seating solutions are designed to be generic so as to be applicable to a broad range of different occupants.

SUMMARY

Currently available seats may include features that offer a limited number of comfort functions, but the comfort functions are often implemented as stand-alone features and rely on manual inputs from the occupant. This approach to comfort results in limited options that can be hard to navigate. In addition, the approach fails to consider that future drivers of vehicles may spend less time driving a vehicle (because of semi-autonomous and autonomous vehicle technologies) and desire more comfort, convenience, and physical and emotional benefits from vehicle seats.

In one aspect, a system for automatic seat adjustment is provided. The system includes a seat frame, a plurality of seat cushions coupled to the seat frame, a plurality of adjustable bladders enclosed within the plurality of seat cushions, and a plurality of sensors enclosed within the plurality of seat cushions. The system also includes a memory for storing user data and a plurality of seat adjustment programs for controlling the at least one of the plurality of adjustable bladders. The system further includes at least one controller coupled to the memory, the plurality of adjustable bladders, and the plurality of sensors, the at least one controller configured to modify at least one of the plurality of adjustable bladders based on feedback from at least one of the plurality of sensors, the user data, and the seat adjustable programs.

In some aspects, the plurality of seat cushions include a seat base, a back rest, and a head rest. The system can further include a plurality of temperature control devices. The system can further include a plurality of audio output devices. The system can further include a plurality of tactile feedback generators. The plurality of sensors can include a combination of physiological sensors, pressure sensors, and temperature sensors.

In another aspect, a method for automatic seat adjustment is provided.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, and explain various principles and advantages of those embodiments.

Figure 1:
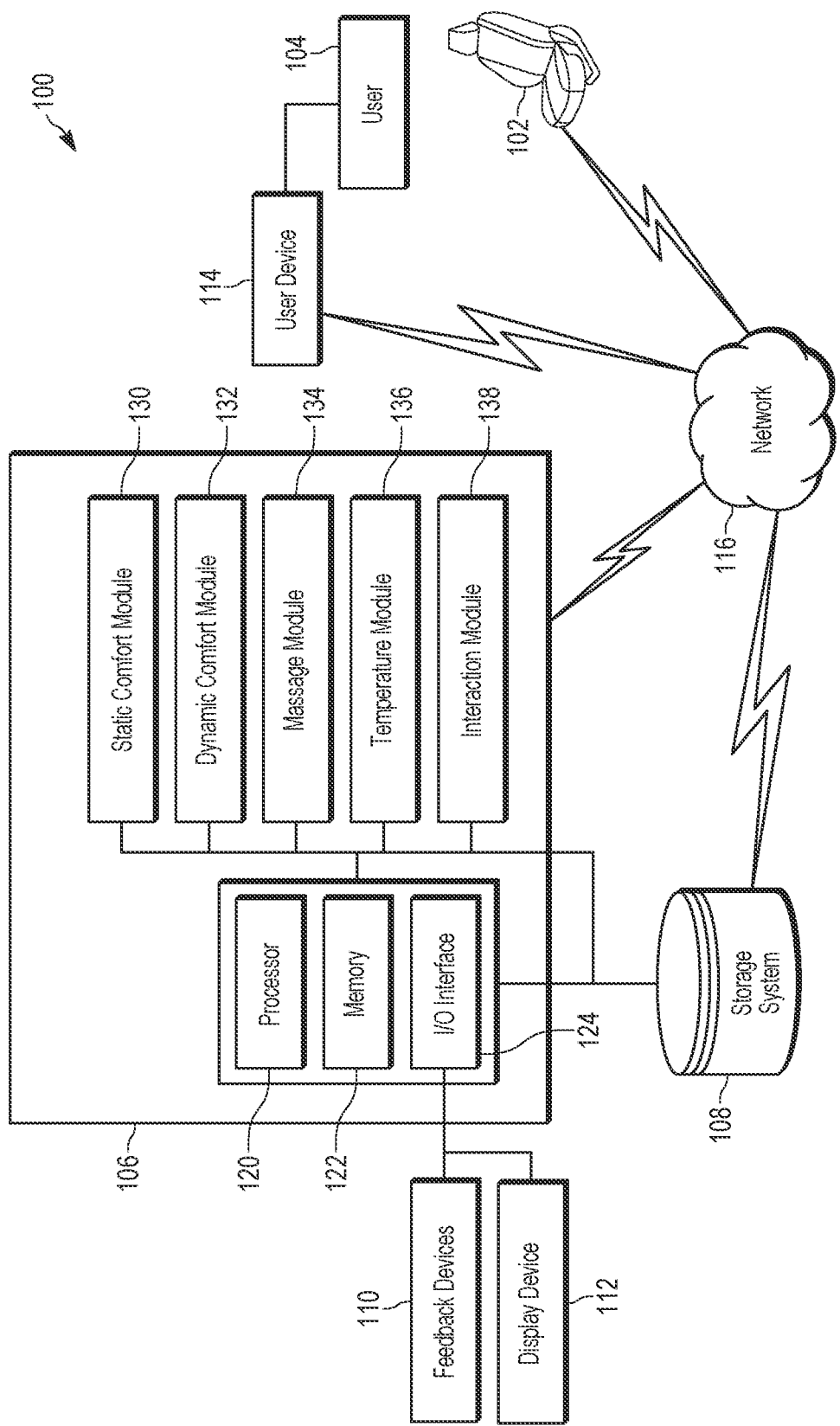
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

The present disclosure provides a seating comfort system that senses a variety of physical and physiologic metrics of a seat occupant to detect and address the occupant's comfort and emotional state. The comfort and emotional state can be improved by adjusting a number of integrated support, contouring, heating/ventilation, and other treatment systems. Methods for improving comfort and treatment of the occupant include static comfort adjustment, dynamic comfort adjustment, vibration massage, biometric massaging, music driven massaging, interactive seating gaming, and heating and cooling. In implementing these methods, the present disclosure implements a series of comfort features for adjusting different physical components of the seat to fit the unique size, shape, and needs of an occupant and improve the occupant's comfort, support, and health. Embodiments are, among other things, capable of adjusting a number of seating components including, among others, seat cushions, firmness, positioning, ventilation, and massage bladders, to promote the particular physical and mental well-being of the seat occupant. The system also uses a number of pressure sensors to provide feedback to a controller about the occupant's physical features and dynamic interaction with the seat. Such adjustments and treatment options can change dynamically to address the transient nature of wellness and comfort by continuously monitoring a set of chosen parameters and react accordingly.

The system and method of the present disclosure provides many benefits over conventional seats. These benefits include ease of use with minimal input required from occupants, personalized experience based on measured data (pressure, temperature, posture etc.) from each individual occupant, optimized adjustments to ensure continuous comfort throughout driving experience, and accurate wellness scoring based on in seat measurements and/or artificial intelligence. Direct assessment of occupants' emotional and physiological states influence adjustments made to the seat. Certain embodiments also provide improved overall in-cabin experience and entertainment and improved overall interaction between an occupant and seat surface with separate approach to driver and passenger needs. In some instances, a user seated in the passenger seat could benefit from a variety of modes that are not suitable for a user in the driver seat. For example, a conversation mode, reading mode, or sleeping mode which would tailor the seating environment to these activities, and modes such as gaming, yoga and other entertainment activities may be offered for a passenger only in autonomous/self-driving, vehicles. In contrast, an anti-fatigue therapy might be more suitable for a driver in a standard vehicle.

Before any embodiments are explained in detail, it is to be understood that the embodiments are not limited in their application to the details of construction and the arrangement of components set forth in the following description or illustrated in the following drawings. Other embodiments are possible and the embodiments described are capable of being practiced or carried out in various ways. For example, it should be understood that although the systems herein depict components as logically separate, such depictions are merely for illustrative purposes. In some embodiments, the illustrated components may be combined or divided into separate software, firmware and/or hardware. These components may be executed on the same computing device or may be distributed among different computing devices connected by one or more networks or other suitable communication connections.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 illustrates an example system 100 for automatically assessing and controlling one or more parameters of a seat 102 and a user 104 (e.g., a vehicle occupant) occupying the seat 102. The system 100 implements a combination of devices to assess the wellbeing of the user 104 and adjusting the seat 102 to enhance the wellbeing of the user. The wellbeing can include a combination of physical, emotional, and mental attributes of the user 104. In some embodiments, the system 100 includes the seat 102, a computing environment 106 communicatively coupled to a storage system 108, a plurality of feedback devices 110, at least one display device 112, and optionally one or more user devices 114. The computing environment 106 includes a computing device having an electronic processor 120, a memory 122, an input output interface 124, and an operating system configured to carry out operations for the applications installed thereon (e.g., in memory 122). The computing environment 106, as represented by FIG. 1, can include, for example, a programmable logic controller, (PLC), a microcontroller unit (MCU), a computer, a server, a laptop, a hand-held device, or other computing devices. In some embodiments, the computing environment 106 is part of the computing architecture of a vehicle. For example, the computing environment can be part of the infotainment system in a vehicle.

Although the computing environment 106 is depicted, for illustrative purposes, as a single entity having a single processor 120, embodiments may utilize a different number of computing devices and processors in a number of different ways. For example, the computing environment 106 can include a single computing device, a collection of computing devices in a network computing system, a cloud computing infrastructure, or a combination thereof. Accordingly, embodiments of the present disclosure are not limited to a single computing environment 106, nor are they limited to a single type of implementation or configuration of the example computing environment 106. The computing environment 106 is merely an illustrative example of a suitable computing system.

Returning to FIG. 1, the various components included within, along with other various modules and components (not shown), to the computing environment 106 are coupled to each other by or through one or more connections (for example, control or data buses) that enable communication between the components. The use of control and data buses for the interconnection between and exchange of information among the various modules and components would be apparent to a person skilled in the art in view of the description provided herein.

The processor 120 obtains and provides information, for example, from the memory 122 via a communication interface, and processes the information by executing software instructions or programs. The memory 122 can include a program storage area and a data storage area and may include a random access memory ("RAM"), a read only memory ("ROM"), or another non-transitory computer readable medium within the memory 122. In some embodiments, the memory 122 stores, among other things, data relating to the seat 102 and the user 104, as discussed in greater detail herein. The program storage can include firmware, one or more executable applications, program data, filters, rules, one or more program modules, and other executable instructions. The processor 120 is configured to retrieve from the memory 122 and execute, among other things, programs or applications related to the methods described herein.

As illustrated in FIG. 1, computing environment 106 may include or otherwise be communicatively coupled to the storage system 108. Similar to the memory 122, the processor 120 obtains and provides information, for example, from the storage system 108 via a communication interface. The storage system 108 can include a combination of devices configured to store and organize a collection of data. For example, storage system 108 can be a local storage device within the computing environment 106, a remote database facility, or a cloud computing storage environment accessible over a network 116 (e.g., a controller area network (CAN) or other vehicle network). The storage system 108 can also include a database management system utilizing a database model. The database management system may be configured to interact with a user, for example, through queries, to facilitate analysis of the database data.

In some embodiments, using data and programming provided in a combination of the memory 122 and the storage system 108, the computing environment 106 uses machine learning to carry out the various aspects of the present disclosure. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, deep learning system, a cognitive system, or the like.

In some embodiments, data can be entered by the user 104 or otherwise obtained from a variety of sources for use by the computing environment 106. For example, the computing environment 106 can receive data from a combination of sources, including, for example, the storage system 108, the feedback devices 110, and the user device(s) 114. In some embodiments, the storage system 108 includes a combination of historical data, collected data about the user 104, and algorithms/programming for analyzing the data.

In some embodiments, the feedback devices 110 include a combination of data collection devices obtaining information about the user 104 and data outputting devices for conveying information to the user 104. For example, the feedback devices 110 can include cameras, physiological sensors, biometric sensors, pressure sensors, and wearable devices. The feedback device may also include audio, video, and haptic devices. In some embodiments, the user device 114 is a device operated by the user 104. For example, the user device 114 can include a smart phone, laptop, wearable device, a smart watch, fitness tracker, etc. that can be paired with or otherwise communicatively coupled to the computing environment 106 for data sharing.

Each of the seat 102, the computing environment 106, the storage system 108, the plurality of feedback devices 110, and the one or more user devices 114 are communicatively coupled to one another. The communicative coupling can be provided via any combination of direct (e.g., wired) connections or indirect connections (e.g., via the network 116) to the computing environment 106. The network 116 may be implemented using a combination of wired or wireless communication components and connections. The network 116 may be used to exchange data between the computing environment 106, feedback devices 110, and the user device (s) 114, exchange data with the storage system 108, and/or to collect or share data with additional sources (e.g., external databases). In some embodiments, devices may use the network 116 to establish connections to other networks, for example, cellular networks and/or the Internet. In addition, components such as the storage system 108 may located remotely (e.g., in the cloud) and communicate with components via the network 116 or another connection.

Each of the devices in the system 100 can include a communication interface for communicating over the network 116. The communication interface is configured to receive input and to provide system output. The communication interface obtains information and signals from, and provides information and signals to, (for example, over one or more wired and/or wireless connections) devices both internal and external to the computing environment 106. The communication interface may include a wireless transmitter or transceiver for wirelessly communicating over the network 116. Alternatively, or in addition to a wireless transmitter or transceiver, the communication interface may include wired connections.

Continuing with FIG. 1, in some embodiments, the computing environment 106 includes or is otherwise communicatively coupled to a display device 112, for example, a liquid crystal display (LCD) touch screen, or an organic light-emitting diode (OLED) touch screen. In some embodiments, the computing environment 106 implements a graphical user interface (GUI) (for example, generated by the processor 120 from instructions and data stored in the memory 122, and presented on the display 112), that enables a user to interact with the computing environment 106. For example, a vehicle including the seat 102 can include a display 112 (e.g., an infotainment system, human machine interface (HMI), etc.). In some embodiments, the computing environment 106 enables displaying data remotely, for example, using a display (configured similarly to the display 122) on the user device 114. Data can be provided from the computing environment 106 to the local or remote display 112 using a combination of connections as was previously discussed.

In some embodiments, the computing environment 106 includes a combination of specialized modules (in one example, programs or groups of programs, which although shown separately may be stored in the memory 122 or even the storage system 108) configured to carry out the various functions of the present disclosure. In some embodiments, the computing environment 106 includes a static comfort module 130, a dynamic comfort module 132, a massage module 134, a temperature module 136, and an interaction module 138 (sometimes referred to as seat adjustable programs). The combination of modules in combination with the other aspects of the system 100 are used to monitor parameters and characteristics of the user 104 and the seat 102. In some instances, the modules also analyze the data and provide feedback to the user 104 and/or commands or control signals to components of the seat 102 or other vehicle components.

In some embodiments, the static comfort module 130 is configured to evaluate and establish a seat contour based on an automated initial assessment of the user 104 and/or manual input provided by the user 104. In some embodiments, the dynamic comfort module 132 is configured to continuously monitor the comfort, wellness, and emotional states of the seat user 104 and provide adjustments to the seat 102 accordingly. In some embodiments, the massage module 134 is configured to monitor biometric signals from the user 104 occupying the seat 102 and suggest or perform a treatment to the user 104 using haptic feedback. In some embodiments, the temperature module 136 is configured to provide heating and cooling to the user 104 through the seat 102, depending on various factors. In some embodiments, the interaction module 138 is configured to enhance interaction between the seat 102 and the user 104 for health and wellness, entertainment, and/or exercise purposes. As would be appreciated by one skilled in the art, the static comfort module 130, the dynamic comfort module 132, the massage module 134, the temperature module 136, and the interaction module 138 can include a combination of hardware and software configured to carry out the various aspects of the present disclosure. Each of modules can be configured to provide users with a system individually or in combination depending on the desired operation of the seat 102 or requirements of the user 104.

Figure 2:
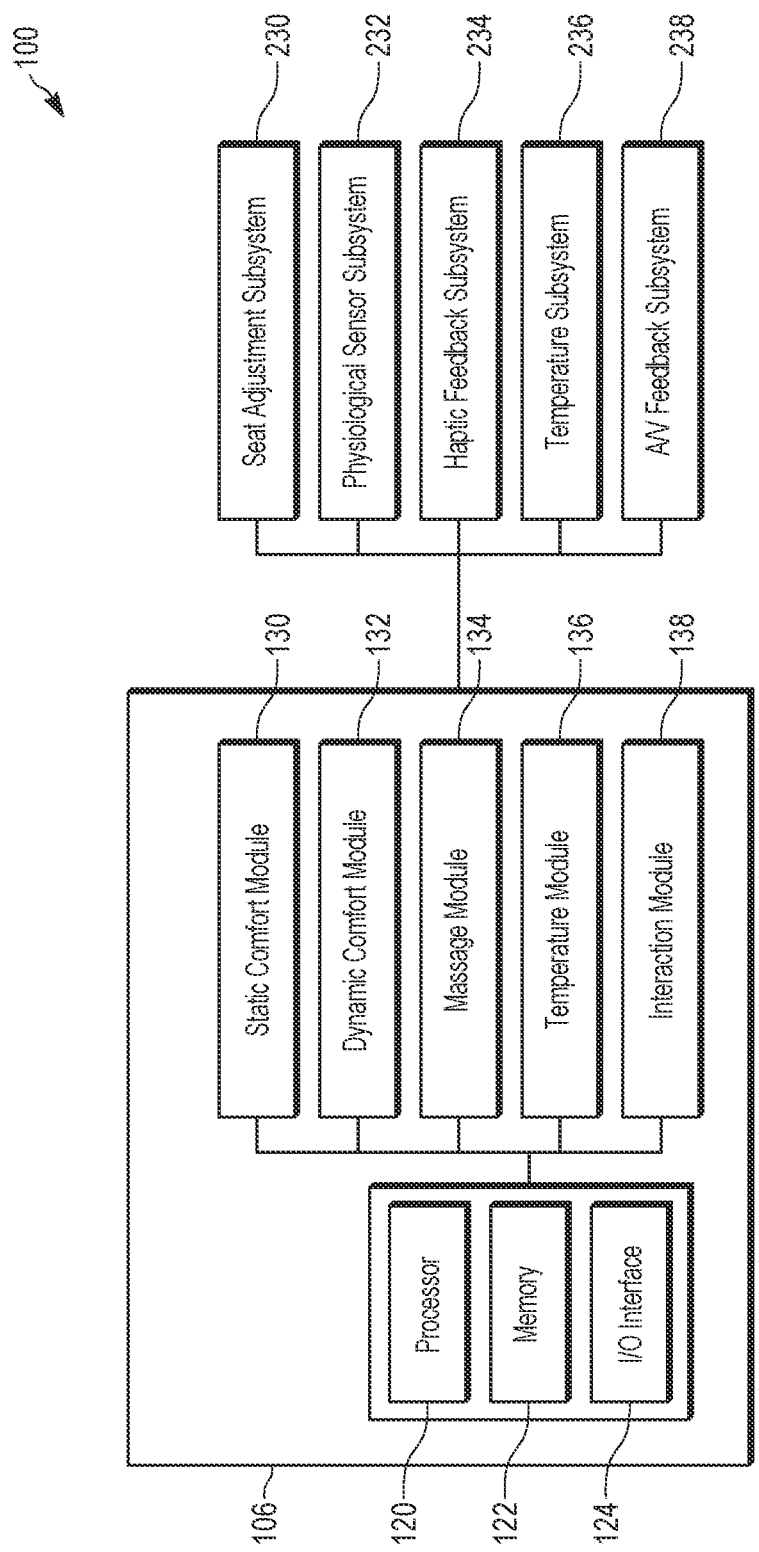
FIG. 2 schematically illustrates a collection of subsystems included in the system of FIG. 1 in accordance with some embodiments.

Referring to FIG. 2, in some embodiments, the modules are combined with a combination of mechanical and electrical subsystems to provide physical feedback to the seat 102 and the user 104. The mechanical and electrical subsystems can include a combination of mechanisms for adjusting the seat 102 itself or the surroundings of the user 104 situated within the seat 102. In some embodiments, the seat 102 includes a seat adjustment subsystem 230, a physiological sensor subsystem 232, a haptic feedback subsystem 234, a temperature subsystem 236, and an audio/visual (A/V) feedback subsystem 238. Each of the subsystems, and their respective components, can be controlled by one or more of the modules 130, 132, 134, 136, 138. The subsystems provided in FIG. 2 can include a combination of mechanical, electrical, and pneumatic mechanisms. Depending on the type of mechanisms used, the seat 102 will include at least one pump, valve, motor, etc.

In some embodiments, the seat 102 includes a combination of power and communication mediums that provide controls to the various seat subsystems and their associated mechanisms. For example, the communication mediums can include cabling, conductive wiring, fiber optic connections, wireless connections, etc. The power and communication mediums can be selected based on the type of mechanisms as well as preferred technologies, cost, etc. In some embodiments, the seat 102 can include at least one system for controlling the various components and subsystems of the seat 102. The electronics can include the computing environment 106 as discussed with respect to FIG. 1 or it can include a separate combination of hardware and software configured to communicate with the system 100.

Figure 3A:
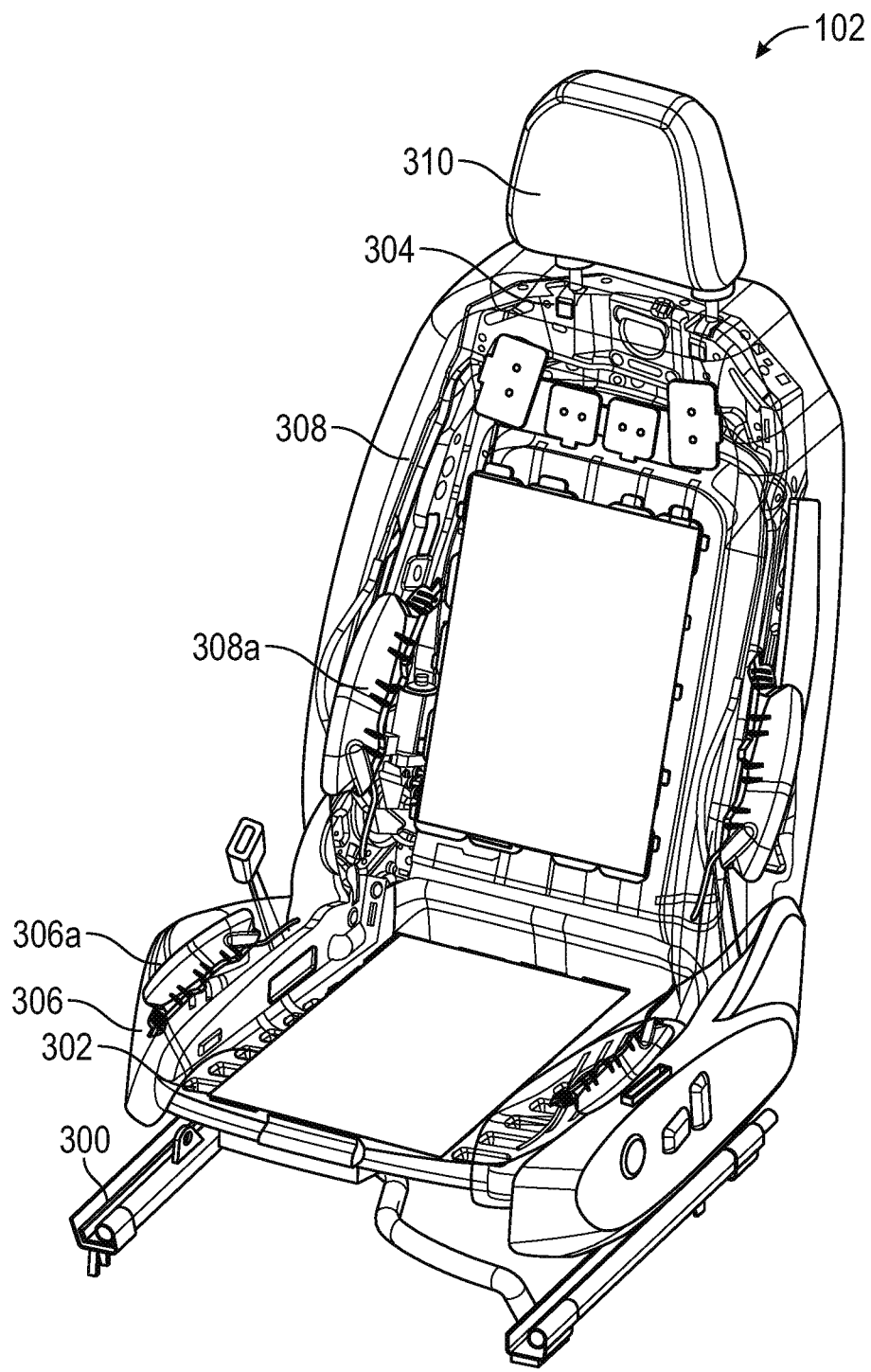
FIGS. 3A, 3B, 3C, 3D, 3E, 3F, and 3G are diagrams of a seat in accordance with some embodiments.

Referring to FIG. 3A, in some embodiments, the seat 102 includes a combination of elements traditionally found in seats and also include the modules and/or subsystems discussed with respect to FIGS. 1 and 2. The seat 102 is designed to include a frame 300 for mounting the seat 102, for example, to a vehicle. The frame 300 frame includes a base frame portion 302 and a backrest frame portion 304 for receiving components related to the seat base 306 and backrest 308 respectively. The backrest frame portion 304 also includes mounting for the headrest 310. The seat base 306, backrest 308, and headrest 310 conventionally include contoured padding (e.g., foam) wrapped in a seat cover, for example, cloth or leather. In some embodiments, the seat 102 includes a plurality of bolster pairs 306a, 308a (e.g., base cushion bolsters 306a and backrest cushion bolters 306b) on the sides of the seat cushions for further fitting the user 104 to the seat 102. Similarly, the backrest 308 includes a shoulder support and lumbar support. The seat cushions for the seat base 306 and the backrest 308 can include an A-surface and a B-surface, a central portion, and two bolster areas. Each bolster area is adjacent the central portion of the seat cushion. The upper surface of the seat cushion (closest to the occupant) may be referred to as the A-surface and the lower surface (closest to the frame 300) may be referred to as the B-surface.

In some embodiments, the seat 102 also includes a seat adjustment subsystem 230 including a combination of mechanical structures to adjust the position, orientation, contour, firmness, and other characteristics of the seat 102. The seat adjustment subsystem 230 provides mechanisms for adjusting a level of support and comfort of the user 104 by changing the contour and pressure levels of different areas of the seat 102. For example, the seat 102 includes mechanisms for adjusting forward and backward movement of the seat, height of the seat, angle of recline of the seat backrest 308, angle of the seat base 306, headrest 310 adjustment, etc. In some embodiments, the seat 102 includes a combination of electromechanical elements for adjusting other aspects of the seat 102. For example, the seat 102 can include mechanism for lumbar support adjustment, seat heating, cooling/venting, bolster adjustment, shoulder adjustment, headrest adjustment, an airbag module, etc. In addition, the seat 102 includes a combination of cables, switches, and motors or actuators for controlling elements of the seat 102 in a manual or an automated manner. For example, the recline angle of the seat 102 can include either a mechanical lever to unlock the recline feature for a user to manually recline the seat backrest 308 position or a switch actuating a motor to move the seat backrest 308 position.

Figure 3B:
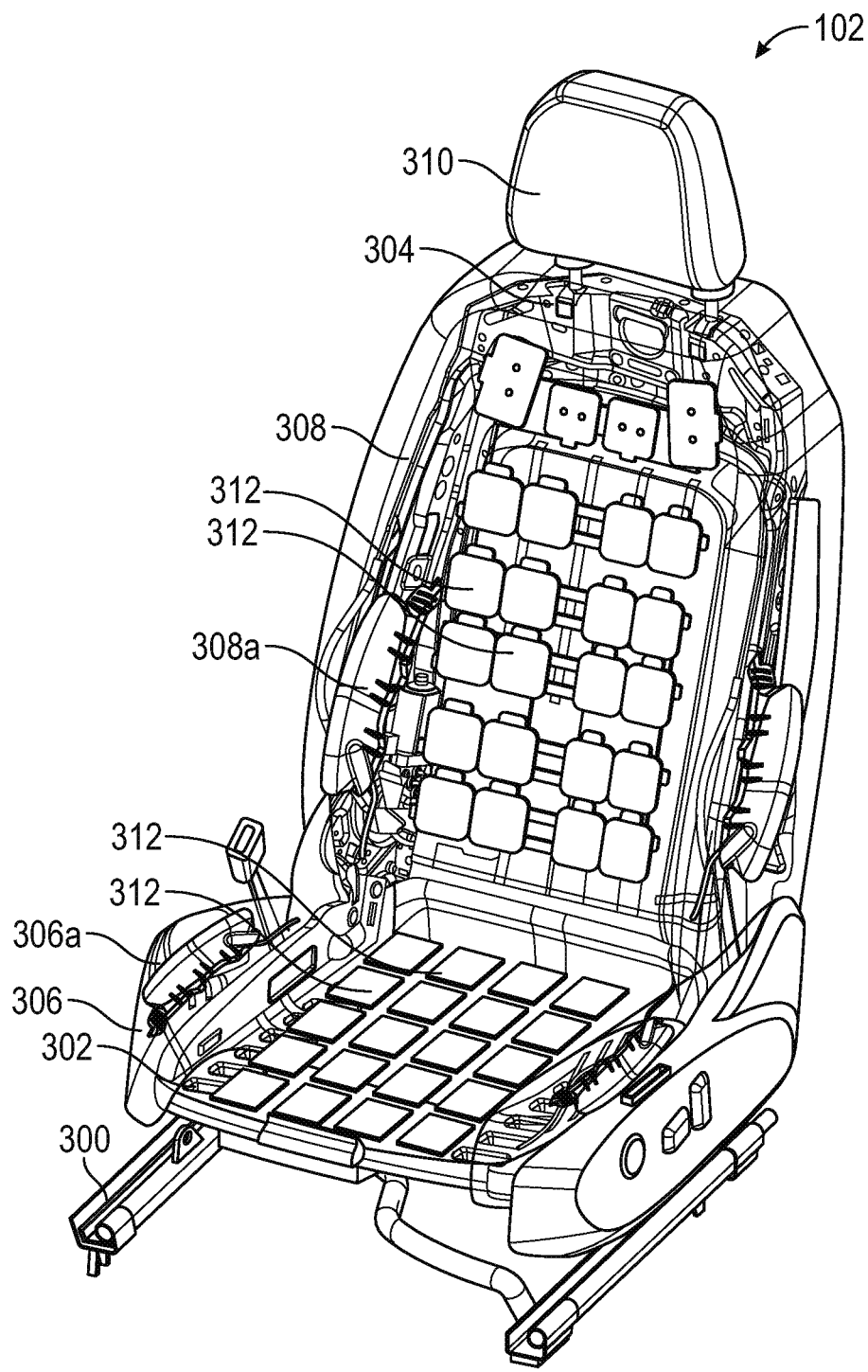

Referring to FIG. 3B, in some embodiments, the seat adjustment subsystem 230 includes a combination of components for controlling contouring of the seat 102 to adjust a level of comfort of the user 104 occupying the seat 102. The comfort of the user 104 can be controlled by modifying at least one of seat contouring, positioning, firmness, etc. of the seat 102. For example, the seat adjustment subsystem 230 includes controls for making adjustments to the base frame 302 and the seat base 306, the backrest frame 304 and backrest 308, and the headrest 310. The controls can be operated by the user 104 to modify the overall seat 102 or portions of the seat. For example, the user 104 can adjust an angle of recline of the backrest, or it can modify the backrest lumbar, bolsters 306a, 308a, suspension, firmness, etc.

In some embodiments, the seat 102 includes a plurality of fluid (e.g., gas, liquid, etc.) filled bladders 312 distributed throughout the seat 102. The plurality of bladders 312 can be positioned at various locations within the seat 102 to provide targeted control for comfort of the user 104, when occupying the seat 102. For example, the plurality of bladders 312 can be position on the A-surface of the cushions, including the seat base 306 and backrest 308 and bolsters 306a, 308a. Any number of the plurality of bladders 312 can be used, with more bladders providing greater granularity or control over customizing the comfort of the seat 102 occupant. For example, as depicted in FIG. 3B, there can be twenty bladders 312 in the seat base 306 and twenty bladders in the backrest 308, with an additional four bladders in the shoulder support of the backrest 308.

In some embodiments, the contouring and/or the firmness of the seat 102 is modified using the plurality of bladders 312. To modify the contouring and/or the firmness of the seat 102, fluid can be added or removed from each of the plurality of bladders 312. To add firmness to a particular a location of the seat 102, fluid is injected into one or more bladders 213 at that location. Similarly, to soften the seat 102 at a particular location, fluid is removed from one or more bladders 213 at that location. Inflation of certain bladders provides seat contouring to address different body types, sizes, etc. and different bladders 312 are selected for inflation/deflation based on the different characteristics of the occupant of the seat 102. The bladders, alone or in combination with the other seat 102 components (e.g., bolsters, cushion support structures, headrest, lumbar supports, etc.) can be adjusted to appropriately fit the occupant while optimizing comfort and support of the user 104, as discussed in greater detail with respect to FIGS. 4-5B.

Figure 3C:
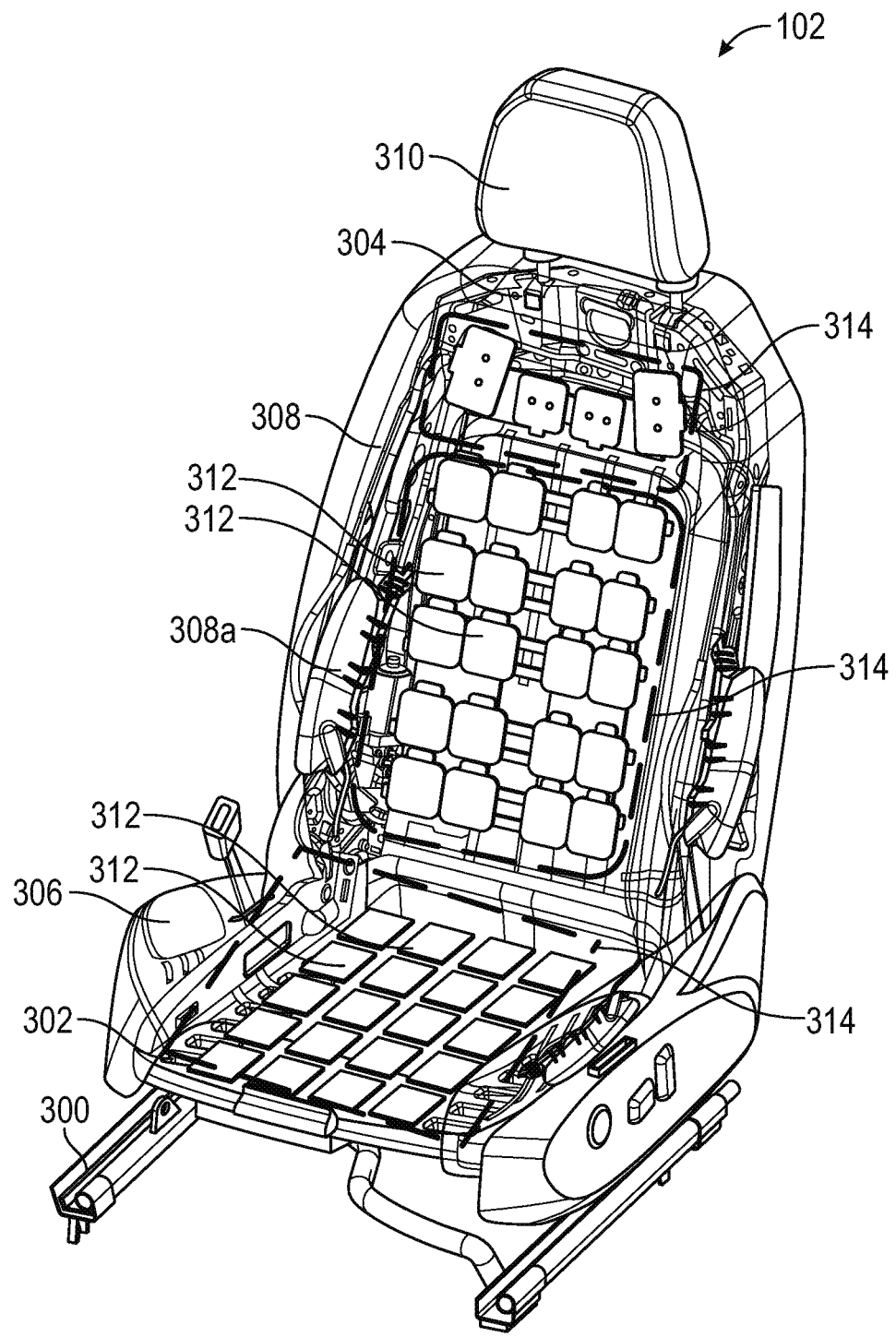
Figure 3D:
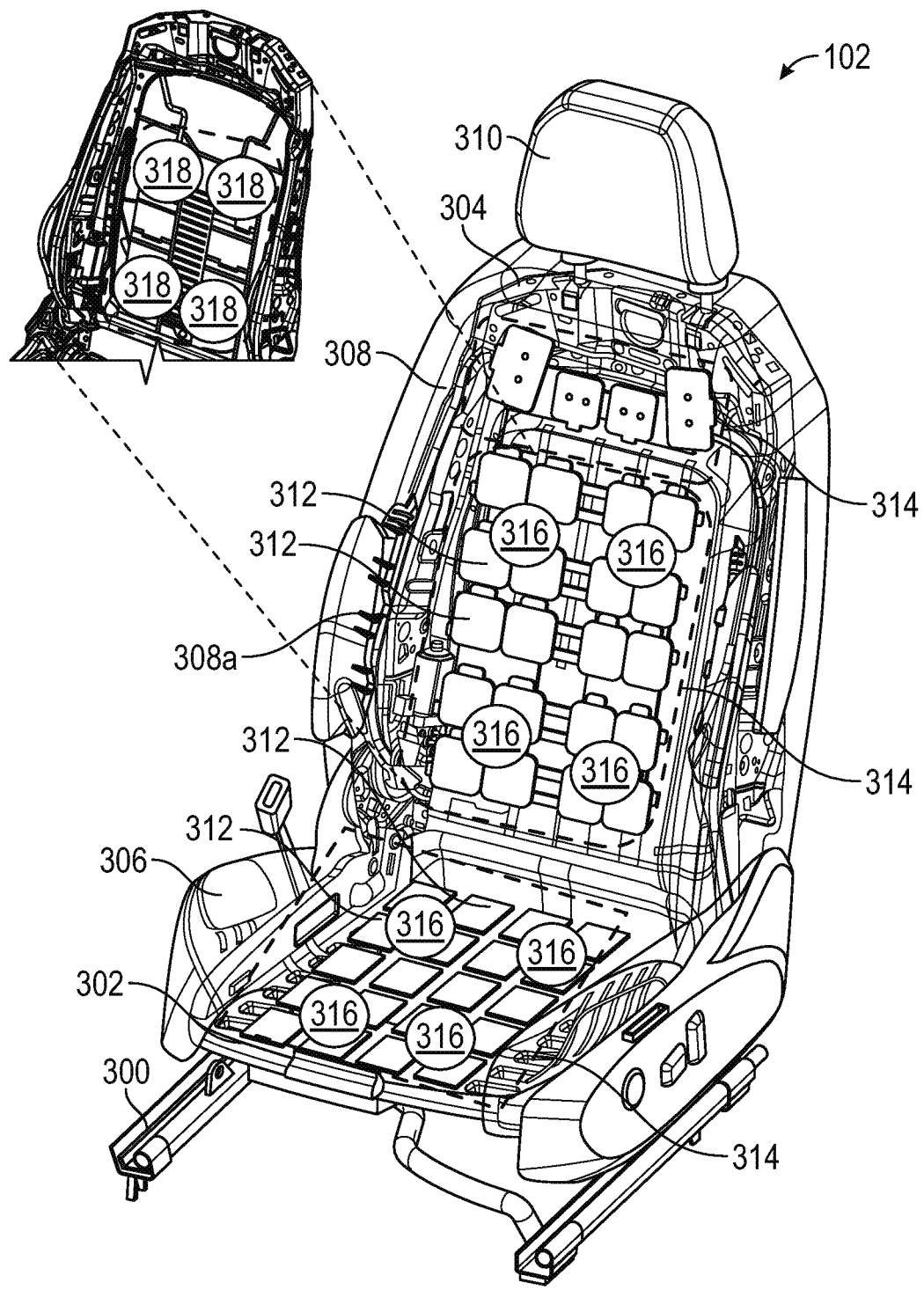
Figure 3E:
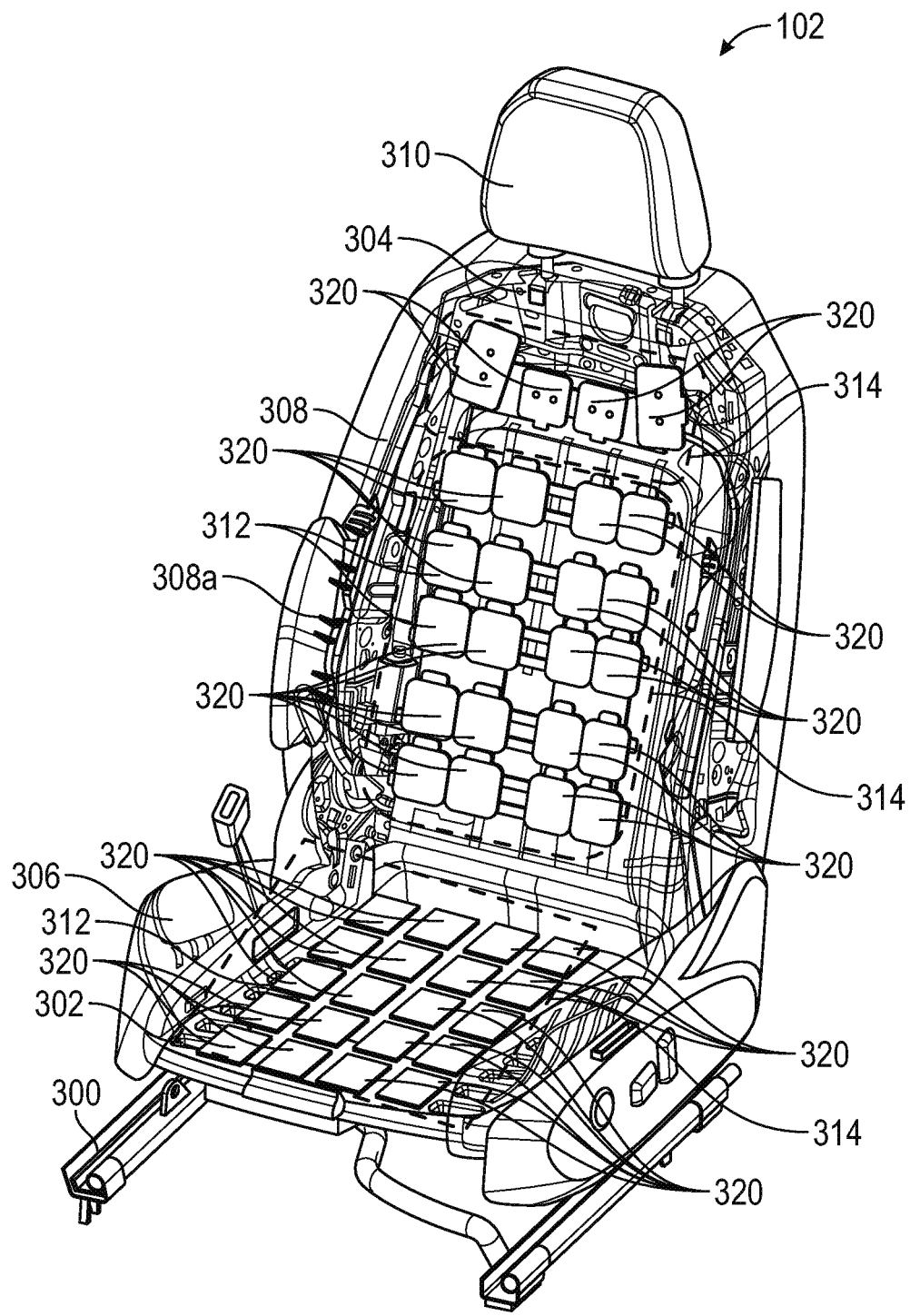
Figure 3F:
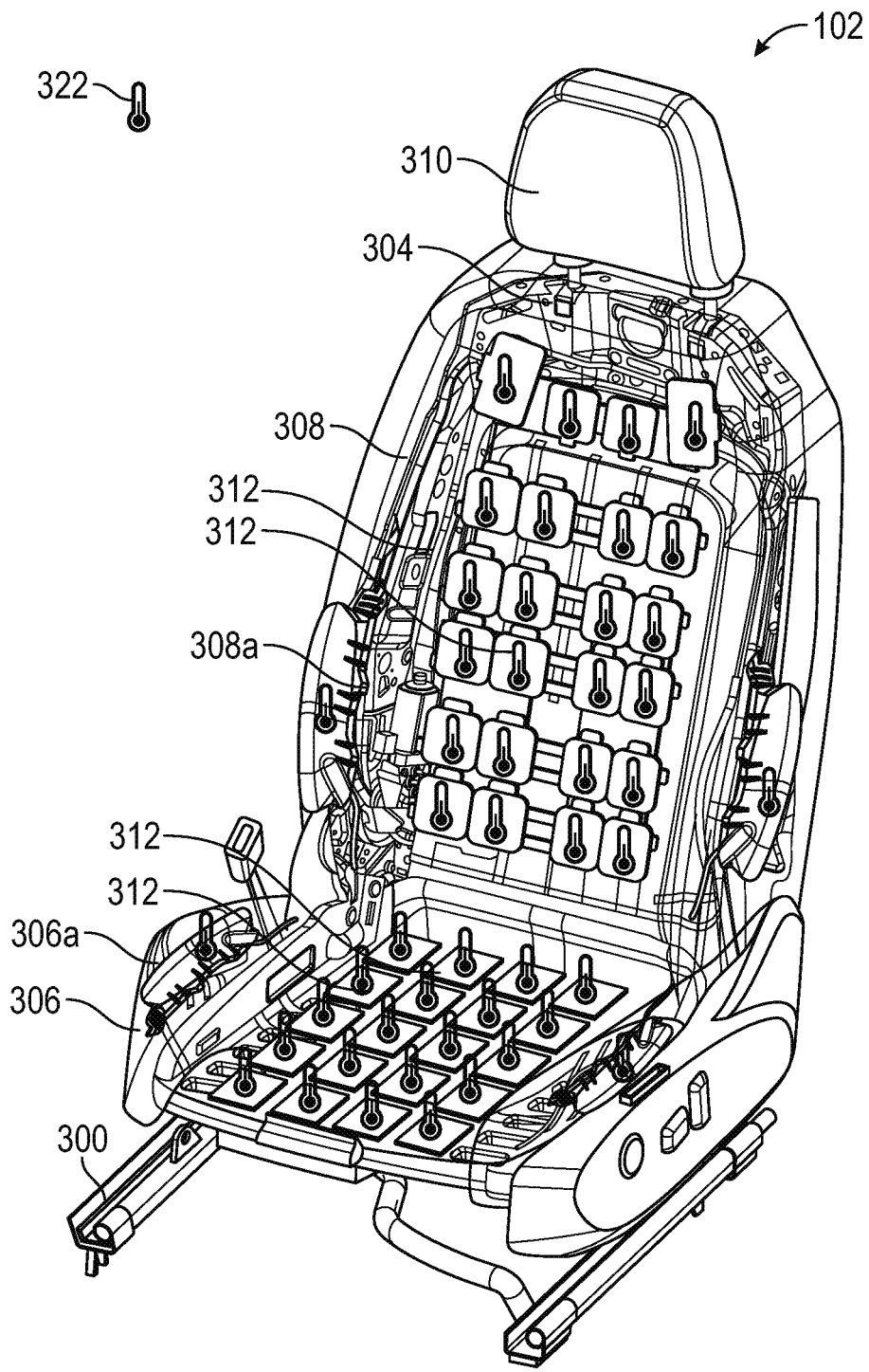
Figure 3G:
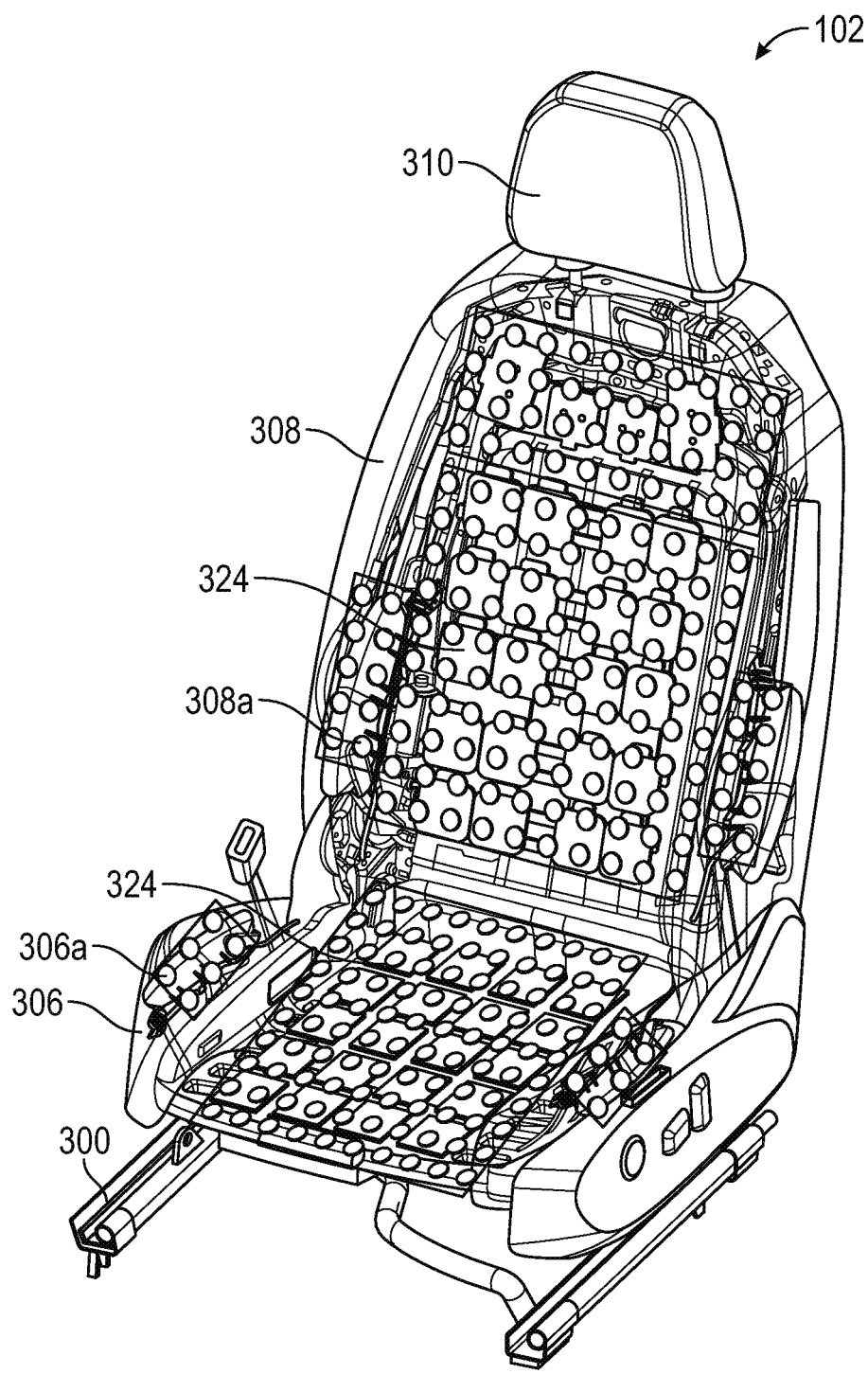

Referring to FIG. 3G, in some embodiments, the plurality of bladders 312 include or otherwise are in communication with a plurality of pressure sensors 324 to measure the pressure of the fluid within each of the plurality of bladders 312, the pressure being applied by the plurality of bladders 312 to the user 104, and/or the pressure being applied by the user 104 to the plurality of bladders 312. The plurality of pressure sensors 324 can include any combination of pressure sensors 324. For example, the plurality of pressure sensors 324 can include an array of inline pressure sensors built into each of the plurality of bladders 312 and/or interface pressure sensors inserted within, on, and/or under the cushions. Different pressure sensors can be used in combination to enhance accuracy, reliability, etc. For example, inline pressure sensor can be used individually or in tandem with interface pressure sensors. In some embodiments, the plurality of pressure sensors 324 are built into the plurality of bladders 312. The pressure sensors 324 can be provided within or otherwise associated with each of the plurality of bladders 312 or in select bladders 312. Different types of pressure sensors 324 can be located at different locations within the seat 102. For example, interface pressure sensors 324 can be applied between the bladders 312 and the cushioning.

Referring to FIG. 3C, in some embodiments, the seat 102 includes the haptic feedback subsystem 234. The haptic feedback subsystem 234 includes a combination of mechanisms for providing physical feedback to the user 104, such as for example, tactile and kinesthetic feedback. Tactile feedback addresses tactile perception, for example, vibration. Kinesthetic feedback addresses kinesthetic perception of a person's own muscular effort. In some embodiments, the haptic feedback subsystem 234 includes a plurality of massage bladders 314 integrated within or otherwise associated with the plurality of bladders 312. The massage bladders 314 can be located on the A-surface and/or on the B-surface of the seat cushions. For example, the massage bladders 314 can be situated on the A-surface and on top of the plurality of bladders 312. The massage bladders 314 and the plurality of bladders 312 can be specifically arranged and positioned around the seat 102 to provide specific functions. For example, the massage bladders 314 can be located on the A-surface of the seat cushions can provide massaging feedback to a user, whereas the plurality of bladders 312 located on the B-surface of the seat cushions can be provided for overall seat contouring.

A number of massage bladders 314 can be used in combination with the plurality of bladders 312. The massage bladders 314 can be a one-to-one combination with each of the plurality of bladders 312, less than the number of plurality of bladders 312, or greater than the number of plurality of bladders 312. For example, as depicted in FIG. 3C, the seat 102 can include four A-surface shoulder massage bladders 314, twenty A-surface back massage bladders 314, and twenty A-surface base cushion massage bladders 312. The massage bladders 314 are configured to be activated in various patterns to provide therapeutic benefits to the user 104 and providing treatment in response to one or more monitored attributes of the user 104, as discussed in greater detail with respect to FIGS. 5A-12.

Referring to FIG. 3D, in some embodiments, the haptic feedback subsystem 234 includes a plurality of tactile feedback devices 316 for creating vibration that acts on the user 104. The feedback devices 316 can include a combination of devices that generate a tactile output. For example, the tactile feedback devices 316 can include the massage bladders 314, haptic motors, rollers, actuators, etc. The feedback devices 316 can be separate devices situated at different locations within the seat 102. For example, the feedback devices 316 can be recessed within the cushioning (e.g., between the A-surface and/or on the B-surface of the seat cushions), on the A-surface of the cushions, or on the B-surface of the cushions. A number of feedback devices 316 can be used in the seat 102 at various locations within the seat. The feedback devices 316 can be a one-to-one combination with each of the plurality of bladders 312, less than the number of plurality of bladders 312, or greater than the number of plurality of bladders 312. The number of feedback devices 316 can be tailored (increased/decreased) depending on the seat design and application. For example, as depicted in FIG. 3D, the seat 102 can include eight feedback devices 316, four on the backrest 308 and two on the seat base 306. The feedback devices 316 are configured to be activated in various patterns to provide therapeutic and entertainment benefits to the user 104 and providing treatment and entertainment in response to one or more monitored attributes of the user 104, as discussed in greater detail with respect to FIGS. 5A-12.

Continuing with FIG. 3D, in some embodiments, the seat 102 includes the A/V feedback subsystem 238. The A/V feedback subsystem 238 includes a combination of mechanisms for providing audio and/or visual feedback to the user 104. The audio and/or visual feedback includes mechanical and electrical components that provide audio or visual cues to the user 104. In some embodiments, the A/V feedback subsystem 238 includes a plurality of haptic feedback devices 318 and display devices, such as display device 112 or user device 114. In some embodiments, the A/V feedback subsystem 238 is configured to work with existing audio and visual output devices situated around the seat 102. For example, when the seat 102 is located within a vehicle, the A/V feedback subsystem 238 can be communicatively coupled to the speaker system of the vehicle, the infotainment or HMI display (or other displays) within the vehicle housing the seat 102, and/or the user devices 114 within the vehicle.

In some embodiments, as shown in FIG. 3D, the seat 102 includes a plurality of haptic feedback devices 318 for creating haptic feedback to the user 104. For example, the haptic feedback devices 318 can be voice coils, linear actuators, rollers, etc. The haptic feedback devices 318 can be separate devices situated at different locations within the seat 102. For example, the haptic feedback devices 318 can be situated under the cushions (e.g., on the B-surface), recessed within the cushions, or on top of the cushions (e.g., in the headrest 110). The haptic feedback devices 318 can be associated on a one-to-one basis with each of the plurality of bladders 312, or in numbers that are less or greater than the number of plurality of bladders 312. For example, as depicted in FIG. 3D, the seat 102 includes four haptic feedback devices 318 situated on the backrest 308 proximate to the lumbar support. The haptic feedback devices 318 can also include devices outside of the seat 102, for example, speakers in the vehicle, on the user device 114, etc. The haptic feedback devices 318 are configured to be activated in various patterns to provide therapeutic and entertainment benefits to the user 104 and providing treatment and entertainment in response to one or more monitored attributes of the user 104, as discussed in greater detail with respect to FIGS. 5A-12.

Referring to FIG. 3E, in some embodiments, the seat 102 includes the temperature subsystem 236. The temperature subsystem 236 includes a combination of mechanisms for providing heating and/or cooling to the user 104. The heating and cooling are provided by mechanical and electrical components. In some embodiments, the temperature subsystem 236 includes a plurality of temperature controlling elements 320 to provide targeted temperature change to areas on the seat 102. The plurality of temperature controlling elements 320 are positioned at various locations across the seat 102, for example, in the backrest 308 and the seat base 306. In some embodiments, the plurality of temperature controlling elements 320 are also positioned on or in the bolsters 306a, 308a and optionally the headrest 310.

In some embodiments, the plurality of temperature controlling elements 320 are heating pads for providing regional heating to improve comfort and/or enhance individual functions implemented in the seat (e.g., therapeutic massage) and/or optimize user experience. The heating pads can be used to provide targeted heating based on personal preference and/or therapeutic effects. In some embodiments, the plurality of heating pads can be individually controlled to provide different levels of heating at different locations on the seat 102. For example, the plurality of heating pads can have different heat levels based on regions that may be associated with different temperature sensitivities or user preferences. The plurality of temperature controlling elements 320 are not limited to heat pads and can include a combination of devices capable of generating heat. For example, the plurality of temperature controlling elements 320 can be heating coils, heat vents, or can include a system for heating the fluid within the plurality of bladders 312.

In some embodiments, the plurality of temperature controlling elements 320 are cooling vents or pads for providing regional cooling. The cooling vents can be used to provide targeted cooling based on personal preference, games, massage patterns, therapeutic effects, etc. In some embodiments, the cooling vents are individually controlled to provide different levels of cooling at different locations on the seat 102. For example, the plurality of cooling vents can have different cooling levels based on regions that may be associated with different temperature sensitivities or user preferences. In some instances, the plurality of temperature controlling elements 320 include cooling gels or include a system for cooling the fluid within the plurality of bladders 312.

Referring to FIG. 3F, in some embodiments, the temperature subsystem 236 includes a plurality of temperature sensing elements 322 to monitor temperatures at different locations on the seat 102. The plurality of temperature sensing elements 322 are positioned across the seat 102, for example, in the backrest 308 and the seat base 306. In some embodiments, the plurality of temperature sensing elements 322 are also implemented with the bolsters 306a, 308a and optionally the headrest 310. The plurality of temperature sensing elements 322 can be positioned proximate to each of temperature controlling elements 320 or at different locations on the seat 102. In some embodiments, the plurality of temperature sensing elements 322 provide feedback regarding the interface temperature between the user 104 occupying the seat 102 and the A surface of the seat 102, as a consequence, the user's thermal comfort can be determined and controlled.

In some embodiments, the system 100 includes a physiological sensor subsystem 232 configured to capture physiological or biometric data associated with the user 104. The physiological sensor subsystem 232 includes sensors for capturing and monitoring physiological metrics (or biometric data) of the user 104. Examples of psychological data include heart rate, heart rate variability, blood glucose, blood pressure, respiration rate, body temperature, blood volume, sound pressure, photoplethysmography, electroencephalogram, electrocardiogram, blood oxygen saturation, energy expenditure, and skin conductance.

In some embodiments, the physiological sensor subsystem 232 is designed to work with existing physiological data capturing devices situated around the seat 102. For example, when the seat 102 is located within a vehicle 102, the physiological sensor subsystem 232 are communicatively coupled to the sensors or cameras within the vehicle and/or the user devices 114 within the vehicle, such as for example in vehicle cameras, steering wheel sensors, wearable devices, etc. In some embodiments, the seat 102 includes a plurality of the physiological capturing devices for capturing physiological data from the user 104 in the seat 102. The physiological capturing devices within the seat 102 can include a combination of physiological sensors. For example, the seat 102 can be equipped with skin contact sensors for monitoring galvanic skin response (GSR) and electrocardiogram (EGG).

Although examples have been illustrated and discussed with respect to a "bucket" style seat for use in a vehicle, it should be understood that the principles of the present disclosure are applicable to other types of seat assemblies, such as bench seats, baby seats, chairs, couches, workout bench, etc. It should also be understood that the principles of the present disclosure discussed with respect to the cushions are also applicable to other structures of the seat or seat accessories, such as for example, back rests, back support pads, arm rests, footrests, seat belts, head restraints, etc. Similarly, although discussed in examples for use within a seat in a vehicle, the present disclosure is not intended to be limited to seats for a vehicle.

Figure 4A:
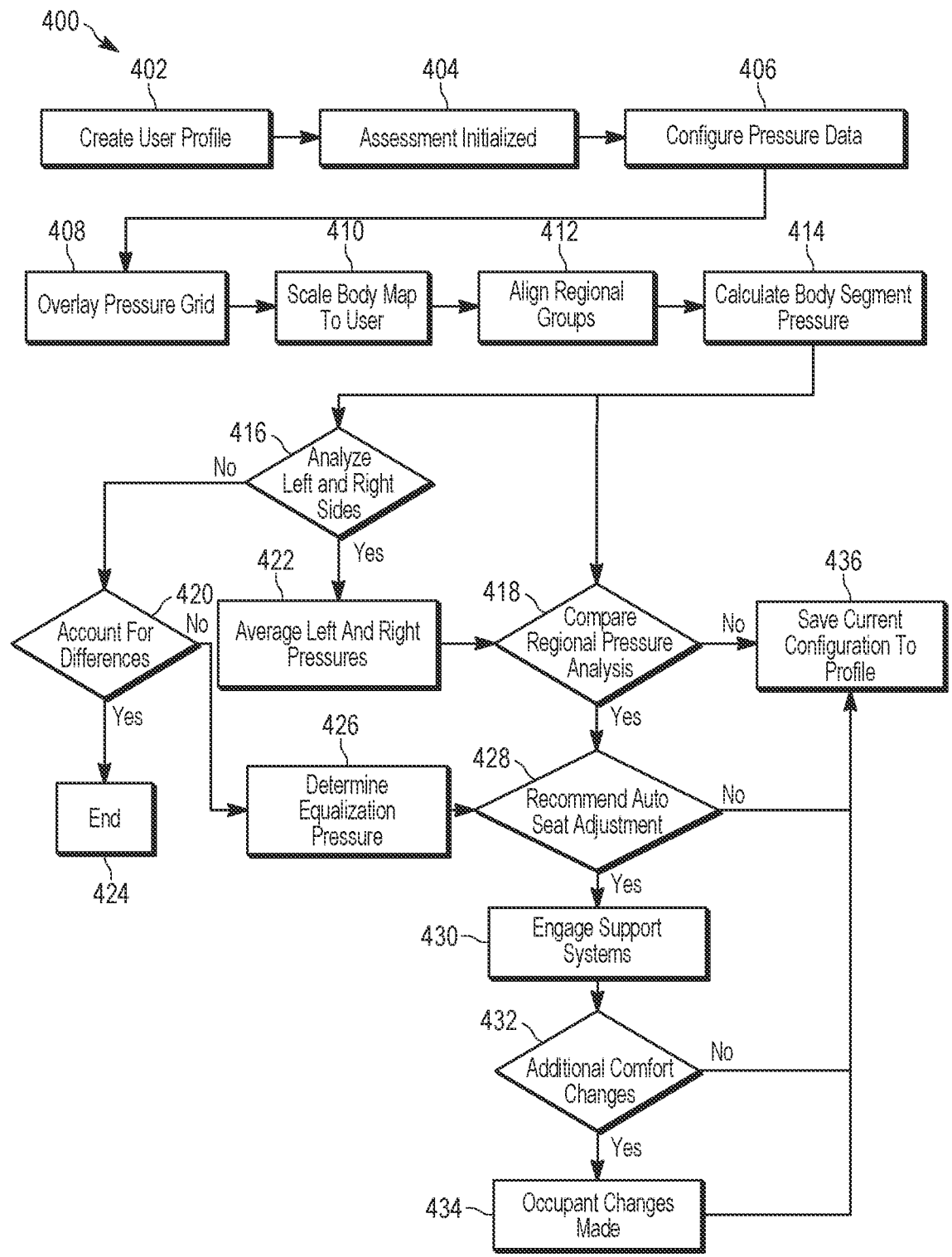
FIG. 4A is a flowchart of a method for implementing static comfort in accordance with some embodiments.

Referring to FIG. 4A, a flow chart depicting an example process 400 for operation of the seat 102. The process 400 provides steps for establishing a contour of the seat 102 based on the user's 104 size, shape, and personal preferences. The seat contour includes adjusting some combination of the bolsters 306a, 308a, lumbar, plurality of bladders 312, seat recline, seat height, seat angle, etc. within the seat adjustment subsystem 230. The contour of the seat 102 is based on a combination of a manual input from the user 104 and/or automatic adjustment based on analysis (e.g., performed by traditional software or artificial intelligence) provided by the computing environment 106 based on an initial assessment of the user 104 within the seat 102.

Initially, at step 402, a user profile is optionally created to allow for a more accurate initial tailoring of the seat 102. For example, the user 104 can create an account and populate a user profile when registering the device (e.g., the vehicle) housing the seat 102 or application (or app) associated with operation of the seat 102. The user 104 can also edit, update, review, etc. the user profile in a similar manner. Accessing the user profile for creation, edition, viewing, etc. can be performed using devices in the system 100. For example, the local computing environment can include a touch screen for accessing and editing the user profile or an app can be downloaded on the user device 114. The user profile includes data that may be useful for the computing environment 106 to learn user preferences and evaluate the user 104 to provide personalized adjustments to the seat 102 for optimizing comfort of the user 104. Alternatively, a user 104 operates the seat 102 without the creation of a profile and the method starts at step 404.

Once the user 104 sits in the seat 102, the pressure between the user 104 and the seat 102 is assessed (step 404). The assessment is provided by activating the plurality of pressure sensors 134, as discussed with respect to FIG. 3G, when the seat back 308 and the seat base 306 are occupied by the user 104. In some case, the assessment is activated when the total load experienced over the plurality of pressure sensors 134 is greater than a predetermined value. For example, when the combined pressure calculated load on the seat 102 exceeds 36 kilograms, the assessment is initialized.

At step 406, pressure data from the activated plurality of pressure sensors 134 is electronically configured to represent the physical locations of their originating value for a seat interface mapping. For example, pressure values for each location within the seat 102 are measured and mapped to specific locations within the seat 102. The pressure values for each location can be laid out in a grid (see FIGS. 4B and 4C), as defined by the physical locations of the sensors within the seat 102. The grid of pressure values provides an initial pressure map of the user 104 representing locations and posture of the user's 104 body. The pressure values can be static values captured at a specific point in time or can be a collection of values collected over time (dynamic data). The pressure map is stored to the user profile for future reference. In some embodiments, the pressure map is periodically updated over time and compared to previously stored pressure maps.

Figure 4C:
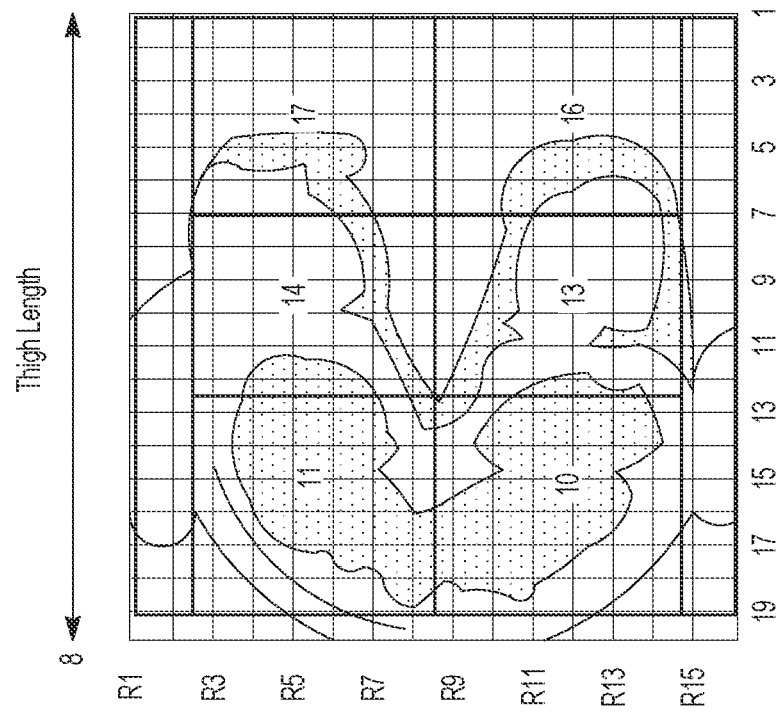
FIGS. 4B and 4C illustrate aspects of the pressure measurements evaluated by the method of FIG. 4A in accordance with some embodiments.
Figure 4B:
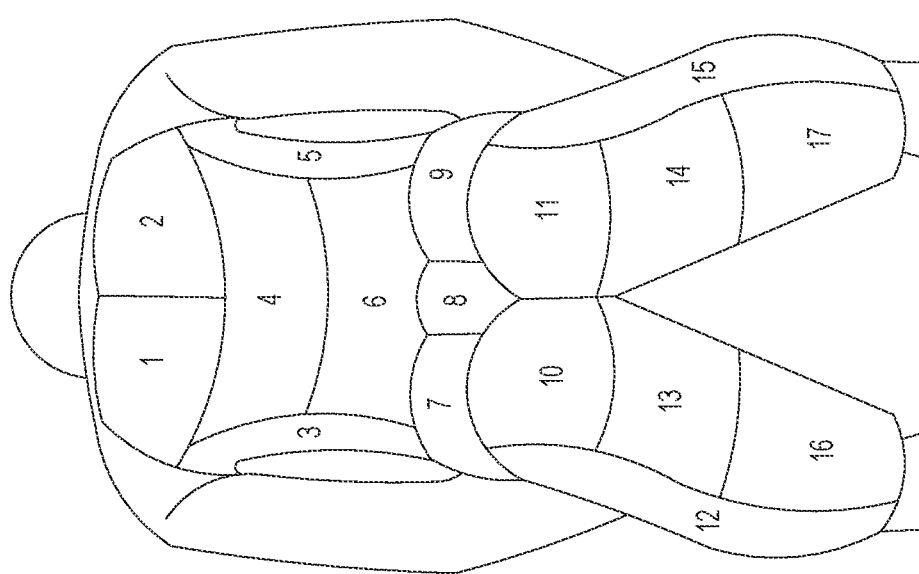

At step 408, the pressure values are electronically overlayed into a pressure grid representing regional body mapping zones of a human body model. Referring to FIG. 4B, a predetermined human body model is provided including a plurality of zones for mapping the various pressure values. Specifically, FIG. 4B is providing a visual representation of how the human body could be divided up for pressure distribution purposes. The system 100 stores an ideal pressure distribution for each of the sections depicted (the number of sections can be changed/modified) and strive to achieve said ideal pressure by inflating/deflating bladders and/or adjusting the overall seat layout based in part on the defined sections. The plurality of zones in the human body model correspond to different sections of a human seated in the seat 102. For example, as depicted in FIG. 4B, the human body model can include 17 predetermined zones with zones 1 and 2 corresponding to the shoulders down to zones 16 and 17 representing the lower hamstrings. As would be appreciated by one skilled in the art, the human body model can include a different number of zones and, although not depicted in FIG. 4B, can include zones for the head, arms, legs, etc. The pressure values for each zone can be represented by individual sensors or by a sum or average of multiple sensors. For example, zone 1 can include a single pressure sensor associated with that zone or a plurality of sensors representing that zone. Similarly, each zone can include a different number of sensors. For example, zone 1 can include multiple sensors whereas zone 8 may include a single sensor.

In some embodiments, the computing environment 106 is configured to analyze the pressure map and grid to identify different body parts of the user 104. In one example, the computing environment uses artificial intelligence/machine learning to identify where the body parts of the user 104 are located and which body parts they are, based on the pressure values from the plurality of pressure sensors 134. The human body model is associated with the user 104. In some embodiments, the map and/or human body model may be updated based on the user 104. For example, heavier or taller users may have more zones than lighter or shorter users. The human body model can also be created based on prior information obtained about the user or during a configuration step in which the user 104 sits in the seat 102 and the computing environment 106 creates the zones, grids, models, etc. for their user profile. Alternatively, the human body model can be generic to all users, specific genders, size rangers, etc.

At step 410, the mapping of pressure values to the human body model are scaled to fit the user 104. The scaling is preformed using methods to identify how the pressure values correspond to the different zones within the human body model. In some embodiments, the computing environment 106 automatically adjusts the human body model to fit the size and shape of the user 104. FIG. 4C illustrates a general example of pressure distribution in the thigh and buttocks area, for example, as it relates to FIG. 4B. FIG. 4C shows how the zones are defined and can be applied to a pressure distribution data set to divide the seat 102 and adjust it to achieve ideal pressure distribution. For example, as depicted in FIG. 4C, the buttocks and legs can be identified by their shape and the zones corresponding to the buttocks (e.g., zones 10 and 11) and the legs (e.g., zones 13-17) can be adjusted such that the activated pressure sensors 324 match those zones. The scaling is performed using a combination of pressure distribution analysis, advanced occupancy detection, and artificial intelligence. In some embodiments, the size and shape of the user is determined using a combination of inputs. For example, the size and shape of the user can be determined using in-seat pressure sensing, images from cameras, and data from the feedback devices 110 and/or user devices 114 (e.g., wearables).

At step 412, the pressure values within the regional groups of the human body model are aligned. For example, the buttocks regions 10 and 11 are centered around the Ischial Tuberosity (IT) pressure peaks.

At step 414, body segment pressures, corresponding to the zones/model, grid from steps 408 and 410, for the user are calculated. The body segment pressure calculations can include a combination of pressure calculations, for example, percent load, peak pressure, average pressure, and pressure gradient. In some embodiments, average and peak pressures for predefined zones (e.g., FIG. 4B) are determined and compared against ideal values. Each of the pressure calculations can be performed using data from an individual pressure sensor 324 or groups of pressure sensors 324 (e.g., pressure sensors within each zone or the entire seat). In some embodiments, a pressure for each segment/zone is calculated. Once the body segment pressure calculations are performed, additional analysis is performed. In some embodiments, the pressure calculations are used to compare the measured values with the ideal pressure distribution for each defined zone, and based on this comparison, the system is adjusted.

At step 416, the left and right sides of the mapped/scaled human body model are analyzed to determine if they are similar. For example, the left buttocks (e.g., zone 10) and leg (e.g., zones 12-16) are compared to the right buttocks (e.g., zone 11) and leg (e.g., zones 14-17) are compared to one another to see if they are substantially equal. If the values are not similar, within a predetermined threshold, the process 400 advances to step 420. Otherwise, the process 400 advances to step 422. At step 420, a determination is made whether the differences can be accounted for based on other factors. The factors depend on where the user 104 is seated and what activities the user 104 is undertaking. The factors for a driver may differ from the factors for a passenger. For example, the differences between the left-side and right-side leg values caused by the user 104 pressing the accelerator pedal or brake pedal within a vehicle (e.g., the driver) are accounted for. In some embodiments, differences can be accounted for by taking multiple measurements in succession to see if there's any major change or by using AI and advanced data collection. If the differences between the left side and right side can be accounted for, the process ends at step 424. If the differences cannot be accounted for, the process 400 advances to step 426.

Returning to step 422, the left-side and right-side pressures are averaged. The left-side and right-side pressure averages can include individual zones or multiple zones. For example, to determine if there is a left to right unbalance, the average of zones 10,13, and 16 (in FIG. 4B) could be calculated for the left side. At step 426, an equalization pressure is determined for the differences in the sides. To equalize the pressure between sides, different pressure equalization processes can be performed. For example, pressure for one of the two sides can be adjusted to match the pressure being applied to the other side or pressure can be adjusted for both sides until an equilibrium is achieved. In some embodiments, the equalization is determined based on user preferences (e.g., from the user profile). For example, if the left side is firmer than the right side but the right side is within a desired firmness range of the user 104, then it will be determined that the firmness of the left side should be adjusted to match the right side. Once a determination for how to equalize the pressure is made, the process 400 advances to step 428.

Returning to step 418, a regional pressure analysis is compared to predetermined recommended pressure outputs to determine if there is a significant difference between measured and target pressure metrics. In some embodiments, the values calculated during step 414 are compared to ideal pressure values coming from a combination of documented research, empirical data, and/or AI to determine whether there is a significant difference between the measured and target pressure metrics. If the difference between the existing pressure in the seat 102 and the ideal pressure exceeds a predetermined threshold, the system will suggest an adjustment. If there is no significant difference (e.g., the difference is below the predetermined threshold value), the process 400 advances to step 436 where the current seat contour configuration is saved to the user's profile and the process 400 ends. If there is a significant difference, the process advances to step 428 for seat adjustment.

At step 428, a determination is made whether to perform recommended automatic seat 102 adjustment for the user 104. For example, the display device 112 can provide a prompt to the user 104, including approval of the recommended changes. If no changes are needed or desired, the process 400 advances to step 436 where the current seat contour configuration is saved to the user's profile and the process 400 ends. If the recommended change is approved, at step 428, the computing environment 106 advances to step 430. In some embodiments, the automatic seat adjustment is based on the user's 104 assessed size, shape, and individual preferences input by the user 104. A combination of the user profile, pressure and position sensors and other feedback (e.g., cameras, biometric data, etc.) can be used for determining automatic seat adjustment. The size and shape of the user 104 is determined at steps 410. The automatic seat adjustment also includes changes based on steps 416-426. The individual preferences can be assessed by a combination of data collection, artificial intelligence, or the user profile. The recommended seat adjustments can be provided based on the combination of an analysis of the pressure sensor measurements of the user 104 and the user's 104 individual preferences stored in the system 100.

At step 430, once the recommended seat adjustments are approved, the seat 102 is adjusted based on the recommendation. In some embodiments, the changes are implemented by a combination of the seat comfort module 130 and the seat adjustment subsystem to modify the pressure in one or more of the plurality of bladders 312 and/or positioning of at least one of the seat 102 itself, the seat base 306, the seat back 308, or the headrest 310 (including vertical/horizontal movement, lumbar, bolsters, recline, etc.).

At step 432, seat adjustments are evaluated/re-evaluated after a predetermined period of time. In some embodiments, the adjustment evaluation step includes prompting the user 104 whether to input any comfort changes that the user 104 would like to make to the current seat contour configuration. Alternatively, the system 100 monitors manual changes made by the user within the predetermined period of time, as provided in step 434. If no additional comfort changes are made after the predetermined period of time, the process 400 advances to step 436 where the current seat contour configuration is saved to the user's profile and the process 400 ends. If the user elects to make changes, the process 400 advances to step 434.

At step 434, the user 104 manually inputs or requests the system 100 provide further adjustments to the seat contour configuration. In some embodiments, the user's 104 requested changes are analyzed using AI to improve future comfort or are recorded in the user's profile for future reference. The contour created by the plurality of bladders 312 is adjusted by the system 100 and/or the user 104 by applying or relieving pressure on a specific surface area of the seat 102 to inflate/deflate a single bladder or cluster of bladders. For example, user 104 can apply pressure to the left side shoulder area to deflate contouring bladders or relieve pressure in the same area to cause the bladders 312 in that area to inflate and fill a gap between the user 104 and the seat 102. For example, the computing environment 106 detects when a user 104 is intentionally or unintentionally applying or removing pressure from a particular location (e.g., via sensors 134) and adjust the bladders 312 accordingly. The plurality of bladders 312 may also be adjusted manually via a variety of user inputs into the system 100. For example, the user can activate switches on the seat 102 or select sections on a graphical representation of the seat 102 on the display unit 112 or user device 114 to have the contour of the seat 102 updated in particular areas. Once the changes are finalized, the process 400 advances to step 436 where the current seat contour configuration is saved to the user's profile and the process 400 ends.

At step 436, all data from the previous steps are stored, including the size, shape, and preferences of the user 104 as well as the final contour of the seat 102. In some embodiments, any recommendations, user responses, manual/automated changes, that occur throughout process 400 are stored by the computing environment and used for training/updating the AI/machine learning. In some embodiments, after the steps in process 400 are performed, a validation of the seat contouring is performed to train the AI model to optimize future seat contouring recommendations. In some embodiments, further analysis of the user 104 is performed to confirm optimal contouring of the seat 102. The confirmation can be based on manual feedback from the user 104 or can be automatically obtained by observing the user 104 and/or physiological data collected about the user 104. Manual feedback can come in the form of a survey or questionnaire filled out by the user 104 and automatic confirmation can be provided by an emotional analysis based on the user's 104 physiological data (e.g., heart rate, facial recognition, etc.).

In some instances, the process 400 is carried out automatically when the user 104 sits in the seat 102. Once seated, an initial user pressure and posture assessment is performed to personalize seat adjustments based, at least in part, on measured the size and shape of the user 104. After the assessment is complete, the user 104 is queried with a seat personalization prompt and upon approval of the seat personalization, the seat contour is automatically adjusted, for example, by adjusting the plurality of bladders 312 based on the pressure and posture assessment. This operation provides a simplified seat adjustment mechanism which saves time from requiring the user 104 to manually adjust multiple different aspects of the seat 102. Additionally, the use of the pressure sensors 324 and plurality of bladders 312 enables optimized comfort through a higher level of seat contouring than in traditional seats. The contouring is also designed to properly support the occupant for long term comfort, rather than solely relying on the user's 104 own input to contour the seat 102. The process 400 also records historical comfort settings (e.g., in the user profile) provided by the user 104 and the automatic pressure and posture assessment such that machine learning can be used to further optimize recommendations in the future.

Figure 5A:
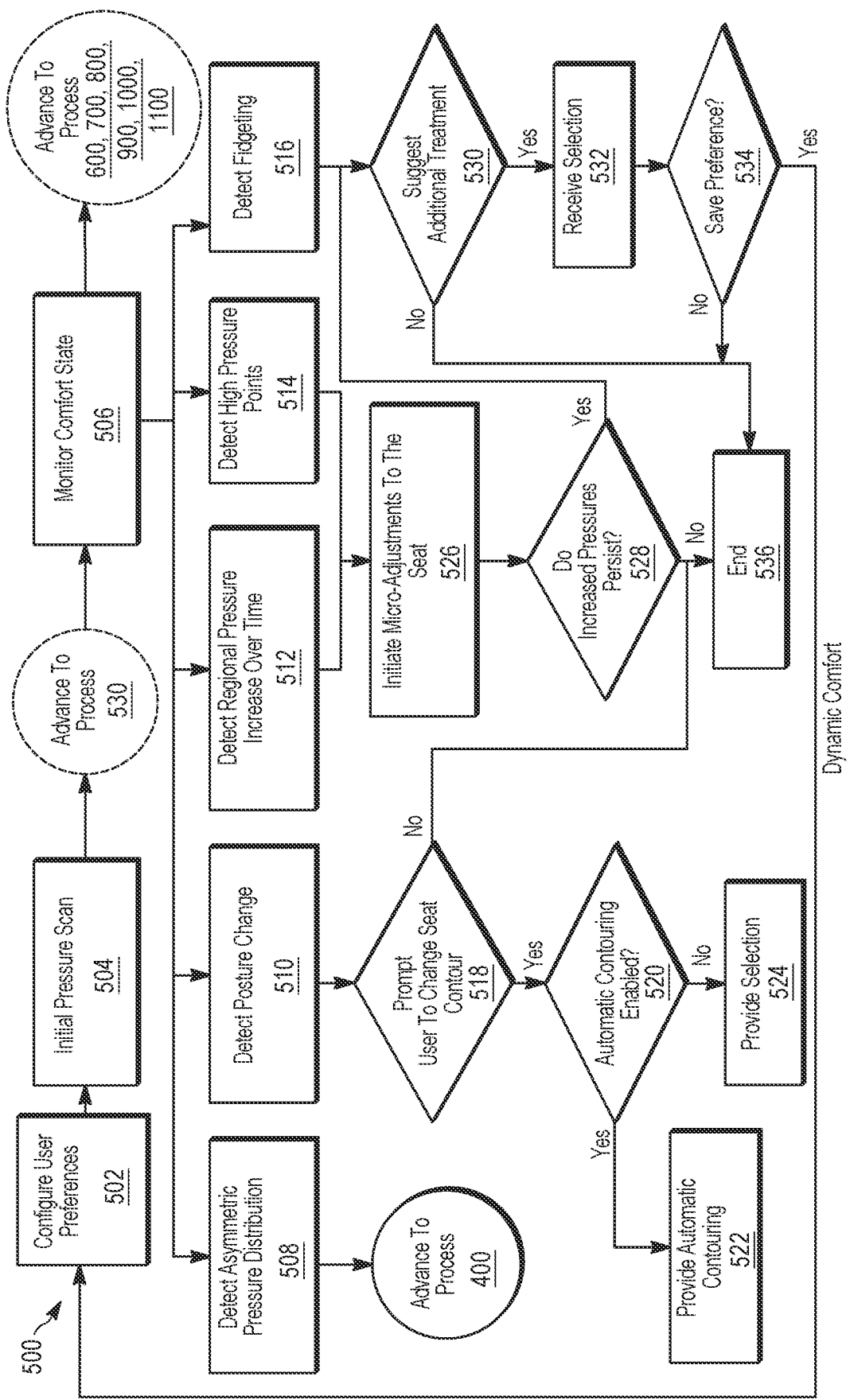
FIGS. 5A and 5B are flowcharts of methods for implementing dynamic comfort in accordance with some embodiments.

A flow chart depicting dynamic comfort control of the seat 102 and/or the area surrounding the seat 102 is shown in FIG. 5A. The dynamic comfort control is a continuous operation based on a combination of factors including the comfort, wellness, and emotional states of the user 104 occupying the seat 102. The dynamic comfort control is provided to monitor the state of the user 104, adjust the seat 102 for comfort, and provide recommended treatment to the user 104 if necessary.

In some embodiments, the continuous monitoring is performed using a variety of pressure readings captured by the plurality or pressure sensors 324 and physiological parameters, captured by physiological sensors. The pressure and physiological data is used to detect a number of predefined triggers such as increased or decreased seat pressure, fidgeting, temperature change, occupant's emotional state (e.g., based on facial recognition, biometrics, etc.), and posture detection. The process 500 responds to different combinations of the measured pressure and/or physiological parameters by proposing or enacting adjustments to the seat 102 contour and/or recommending other treatments. The treatments include, for example, unique variations of massage patterns in conjunction with adjustments in seat contouring, seat-to-occupant interface temperature and airflow adjustments, seat-to-occupant interface pressure adjustments, and overall posture correction. The massage patterns include any combination of massage types and mechanisms for providing the massage. For example, massages can be provided any combination of the massage bladders 314 and haptic feedback devices 110 (e.g., rollers).

The process 500 includes adjusting the seat 102 using the seat adjustment subsystem 230, monitoring the state of the user 104 using a combination of the plurality of pressure sensors 324 and the physiological sensor subsystem 232. When discomfort or another negative state for the user 104 is identified or detected, the process 500 initiates recommended seat adjustments 102 and/or treatment. The recommended seat adjustments 102 and/or treatment includes providing contour adjustment using the seat adjustment subsystem 230, haptic feedback to the user 104 using the haptic feedback subsystem 234, providing temperature control of the user 104 using the temperature subsystem 236, providing A/V feedback using the A/V feedback subsystem 238, or a combination thereof, as discussed in greater detail with respect to FIGS. 4A and 6-12.

Initially, at step 502, user preferences are configured and recorded in the computing environment 106, for example, in an optional user profile. The optional user profile can be created for a more accurate initial tailoring of the seat 102. The user preferences can include selecting options for how the seat comfort adjustments are setup and/or executed. For example, the user 104 can interact with the seat 102 or an HMI to configure the seat 102 and define their preferences for how and when the seat 102 is modified (e.g., contour, haptic feedback, audio feedback, etc.). In some embodiments, the user preferences include initial comfort settings and long-term comfort settings. The initial comfort settings can provide the user 104 an option to select a manual adjustment of the seat 102 or an automatic seat adjustment of the seat 102 in response to discomfort and/or treatment triggers. For the manual adjustment of the seat, the user 104 can adjust the seat 102 using a combination of button, switches, graphical user interfaces, etc. to manually adjust different parts of the seat 102 as desired. For the automatic seat adjustment, the user 104 selects between having the automatic seat adjustment, for example, as discussed with respect to FIG. 4, enabled or disabled. If the automatic seat adjustment is enabled, the user 104 selects whether the automatic seat adjustment is enabled one time (e.g., during initial setup) or always enabled. Both the one-time setup and the always enabled options are saved to the user profile and the process 400 is executed to establish a "static" comfort configuration of the seat 102. Alternatively, a user 104 operates the seat 102 without the creation of a profile/preference selection and would start at step 504.

In some embodiments, as part of the user preferences, the user 104 selects whether to interact with the seat 102 for comfort adjustment. The seat 102 surface adjustment includes modifying the contouring of the seat 102, for example, as discussed with respect to FIG. 4A. In some embodiments, the contour of the seat 102 is based on a combination of a manual input from the user 104 and artificial intelligence provided by the computing environment 106 based on an initial assessment of the user 104. Similar to the selection for the automatic seat adjustment, the user 104 is able to select between having the contouring of the seat 102 enabled or disabled. If the contouring of the seat 102 is enabled, the user 104 selects whether the contouring of the seat 102 is enabled one time (e.g., during initial setup) or always enabled. Both the one-time setup and the always enabled options are saved to the user profile.

At step 504, the process 500 performs a pressure scan of the seat 102 to establish an initial baseline pressure. In some embodiments, the pressure scan includes implementing the steps of process 400 to establish an initial contoured static comfort configuration of the seat 102. In some embodiments, the baseline pressure scan is performed using an interactive seat contouring process 540, as discussed in FIG. 5B. The process 540 can be initiated automatically or it can be initiated by the user 104, for example, by selecting interactive seat contouring from a menu in a graphical display associated with the system 100. In some embodiments, other feedback from the user can be obtained to establish a baseline. For example, in vehicle cameras are used to detect positioning of a user, emotional state of the user, etc.

Figure 5B:
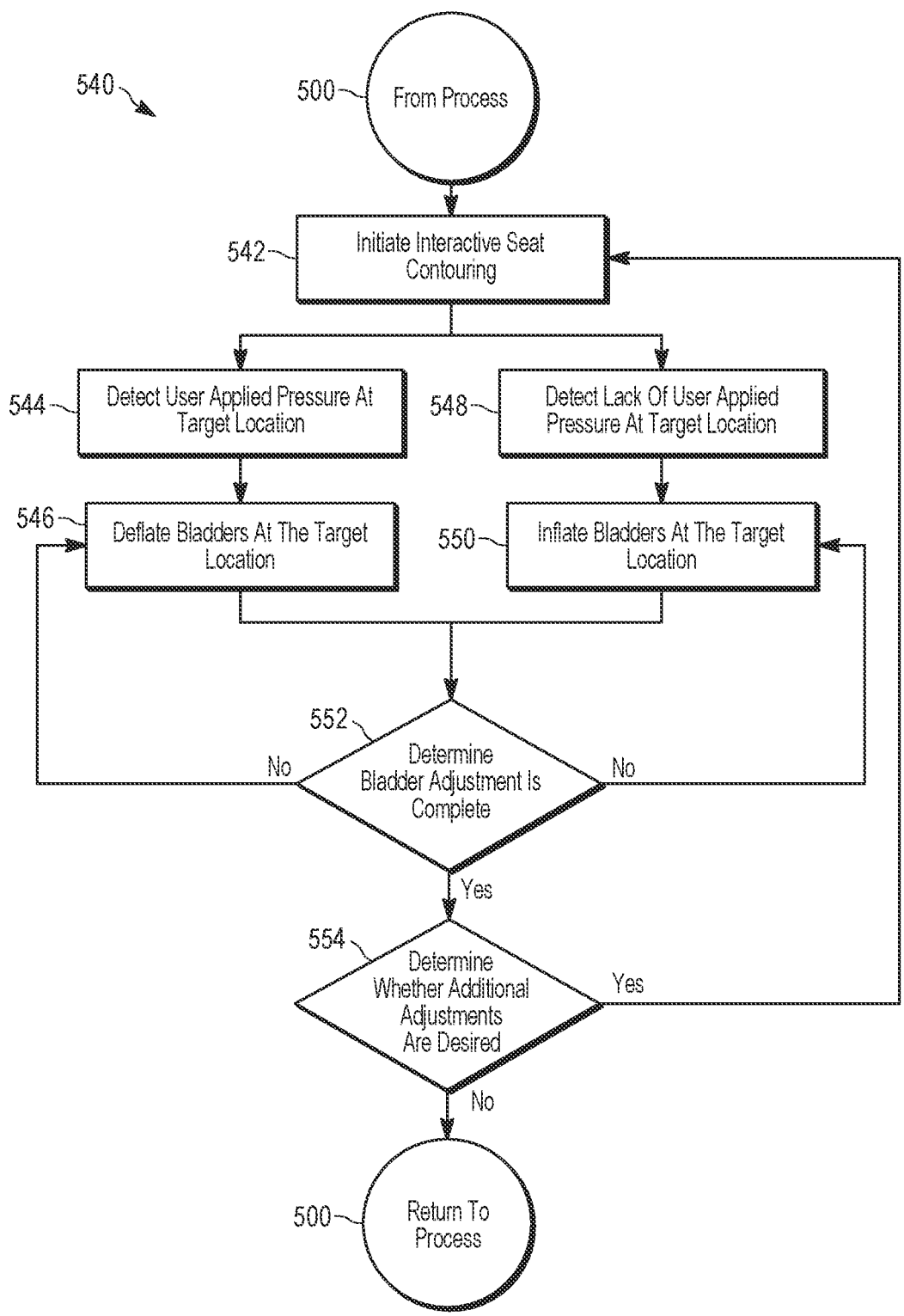

Referring to FIG. 5B, at step 542 of the process 540, user 104 interactive seat contouring is initiated. The interactive seat contouring requires physical input from the user 104, through the user physical interaction with the seat 102 itself, to provide input to areas of the seat 102 that the user 104 would like modification. For example, a user can press harder on areas of the seat 102 where the user 104 would like a reduction in pressure (e.g., from bladder(s) 312 at that location). Once initiated, the interactive seat contouring monitors pressure levels throughout the seat 102 (e.g., via pressor sensors 324) to identify any areas that the user 104 may be indicating for adjustment.

At step 544, the process 540 determines that the user 104 is applying sustained pressure to one or more areas in the seat 102. The area to which the user 104 is applying sustained pressure may reflect an area that the user 104 desires to be less firm. In some embodiments, the sustained pressure is determined by comparing an initial pressure level (e.g., pressure levels from the pressure scan from step 504) to current pressure levels which are elevated over a predetermined threshold for a predetermined period of time. For example, if a regional pressure increases of over 40% is detected (due to the user 104 applying additional pressure to that area) at one or more pressure sensors 324 in the seat 102 for more than 2 seconds, it is determined that they user is indicating an area to be reduced in firmness.

At step 546, in response to determining the user 104 is indicating an area to be reduced in firmness, the process 540 initiates a firmness reduction for at least a portion of the seat 102 at the identified region. In some embodiments, the reduction in firmness is achieved by deflating at least a portion of one or more of the plurality of bladders 312 within the identified region. When a region is identified for pressure reduction, the process 540 deflates at least a portion of all the bladders 312 within the region at substantially the same time or it deflates one or more of the bladders 312 at a time while cycling through all of the bladders 312 in the identified region. Regardless of how many bladders 312 are adjusted within a period of time, the process 540 can continue to evaluate the target region for adjustment until proper adjustment is achieved.

In some embodiments, the process 540 includes an alternate path for user 104 initiated requests for increased pressure at one or more regions in the seat 102. The alternate path includes steps 548 and 550. At step 548, the process 540 determines that the user 104 is applying less pressure or no pressure to areas in the seat 102 that previously had a greater level of pressure being applied. The area that the user 104 is applying lower or no pressure may reflect an area that the user 104 would like an increase in the firmness of the seat 102. In some embodiments, the lower pressure is determined by comparing an initial pressure level (e.g., pressure levels from the pressure scan from step 504) to current pressure levels which are reduced over a predetermined threshold for a predetermined period of time. For example, if a regional pressure decreases of over 40% (due to a reduction in pressure being applied by the user) is detected at one or more pressure sensors 324 in the seat 102 for more than 2 seconds, it is determined that they user is indicating an area to be increased in firmness.

At step 550, in response to determining the user 104 is indicating an area to be increased in firmness, the process 540 initiates a firmness increase for at least a portion of the seat 102 at the identified region. In some embodiments, the increase in firmness is achieved by inflating at least a portion of one or more of the plurality of bladders 312 within the identified region. When a region is identified for pressure increase, the process 540 can inflate at least part of all the bladders 312 within the region at substantially the same time or it can inflate one or more of the bladders 312 at a time while cycling through all of the bladders 312 in the identified region. Regardless of how many bladders 312 are adjusted within a period of time, the process 540 can continue to evaluate the target region for adjustment until proper adjustment is achieved.

At step 552, the process 540 determines that the bladder 312 adjustment is complete. For a deflation process (e.g., steps 544-546), the at least one of the plurality of bladders 312 is deflated until it is either completely deflated or the user 104 has stopped applying the increased pressure. For an inflation process (e.g., steps 548-550), the at least one of the plurality of bladders 312 is inflated until it is either completely inflated or the user 104 has started applying normal pressure or the void is filled. In some embodiments, if the bladders 312 within the identified regions can no longer be modified (e.g., inflated or deflated) the process 540 manipulates one or more bladders 312 from an adjacent or surrounding location proximate to the identified region. For example, if the user 104 is applying sustained pressure to a region including three pressure sensors 324 and the bladders 312 associated with those pressure sensors 324 are all substantially deflated, the bladders 312 adjacent to each of the deflated bladders 312 can begin to be deflated. The same operation exists for bladder inflations. In some embodiments, the determination that the adjustment is complete is an iterative process where a check is performed and then if the adjustment is not complete, the process 540 returns to the previous step, for example, either step 546 or 550. If the adjustment is complete, the process 540 advances to step 554.

At step 554, the process 540 determines whether additional adjustments are required or desired by the user 104. The determination whether additional adjustments are required can be determined automatically by the computing environment 106 or manually received from an input by the user 104. Automatic determination that additional adjustments are required can be triggered based on one or more observed parameters about the user 104. For example, the user 104 is applying increased pressure to another region. Manual input from the user 104 is, for example, provided in response to a prompt to the user 104 (e.g., via display device 112 or user device 114) regarding whether the user 104 would like more comfort changes made. If it is determined that more adjustments are needed or desired, the process 540 returns to the interactive seat contouring at step 542. Otherwise, if no further changes are needed, the process 540 ends and returns to the process 500, for example, to step 506.

Returning to the process 500 in FIG. 5A, at step 506, the process 500 initiates a dynamic comfort monitoring state. At step 506, the process 500 continuously monitors the comfort state of the user 104 while occupying the seat 102. In some embodiments, the comfort state of the user 104 is monitored by a combination of time, pressure, fidgeting detection, interface temperature, emotional detection, biometric data, user input, etc. The comfort of the user 104 is determined by a combination of identifying discomfort cues and emotional evaluation of the user 104.

In some embodiments, as part of the dynamic comfort monitoring in step 506, the process 500 monitors the discomfort and/or emotional state of the user 104 while occupying the seat 102. In some embodiments, the discomfort and/or emotional state of the user 104 is monitored by a combination of feedback from the plurality of physiological (or biometric) sensors, cameras, microphones, etc. within the physiological sensor subsystem 230. For example, the system 100 can utilize a combination of facial recognition analysis, ECG data, and GSR data to determine physiological data such as heart rate, heart rate variability, respiration rate, stress, pain/discomfort, etc. during the emotional state analysis. The discomfort and/or emotional state is used to determine whether seat pressure a specific treatment recommendation is appropriate, as discussed in greater detail herein.

In some embodiments, as part of the dynamic comfort monitoring state in step 506, the process 500 monitors the user 104 seat pressure. The seat pressure is monitored using the plurality of pressure sensors 324. Based on some combination of monitoring the comfort of the user 104, the emotional state of the user 104, and the seat 102 pressure, one or more user discomfort conditions can be triggered. In some embodiments, the discomfort conditions include detecting asymmetric pressure distribution (step 508), detecting posture change of the user 104 (step 510), detecting regional pressure increase by the user 104 (step 512), detecting high pressure points on the user 104 (step 514), and detecting fidgeting of the user 104 (step 516).

At step 508 detecting asymmetric pressure distribution of the user 104 is triggered. An asymmetric pressure distribution occurs when it is determined that the user 104 is favoring one side over the other while occupying the seat 102. An asymmetric positioning can be detected a variety of ways, for example, by comparing pressure levels on a left and right side of the user 104. In some embodiments, the process for detecting asymmetric pressure distribution can be triggered and remedied following steps 414-428, as discussed with respect to FIG. 4A.

At step 510 detecting posture change of the user 104. A posture change occurs when the user 104 has moved from one seating position to another while occupying the seat 102. For example, pressure distribution across zones of the seat 102 when the user 104 is sitting upright will be different compared to a pressure distribution when the user 104 is sitting slouched over. A posture change can be detected in a variety of ways, for example, by comparing pressure distribution across zones (as applied by the user 104 occupying in the seat) of the seat 102 over different periods of time. If a sudden or gradual shift in pressure distribution is detected over multiple zones, the posture change is detected and step 510 is triggered, advancing to step 518.

At step 518 the process 500 prompts the user 104 whether the user 104 would like to change the seat contour. If the user 104 indicates that they would not like the seat contour to be changed, the process advances to step 536 and ends. If the user 104 indicates that they would like the seat contour to be changed, the process advances to step 520.

At step 520, the process 500 determines whether automatic contouring is enabled. In some embodiments, the enablement of automatic contouring is saved in the user profile. Enabling automatic contouring can be initially enabled by default. If the user 104 has enabled automatic contouring, the process 500 advances to step 522, otherwise, the process 500 advances to step 524.

At step 522 automatic dynamic contouring is initiated. In some embodiments, the dynamic contouring includes making micro-adjustments to the overall seat environment to make such changes barely noticeable to the user (not invasive or distracting) yet effective in improving the overall feel and comfort of the seat 102, for example, during long trips. The automatic contouring changes at least one characteristic of the seat 102, such as increasing and/or decreasing pressure (inflating and/or deflating) in at least one bladder 312, changing the position of the seat 102 itself (e.g., reclining, seat angle, seat height, etc.), the seat base 306, the seat backrest 308, the lumbar, the bolsters 306a, 308a, the headrest 310, etc., and/or activating one of the other subsystems. In some embodiments, the type of automatic contouring is defined in the user preferences saved in the user profile. In some embodiments, the user profile specifies a selection of the type of automatic contouring to be executed based on the triggered event. For example, the user 104 can be provided a prompt to initiate interactive seat contouring, as discussed with respect to FIG. 5B, automatically adjusting the seat contour as discussed with respect to FIG. 4, or manual seat adjustment by the user themselves. In some embodiments, process 400 can also be called as a solution to, for example, a recommendation for a large pressure change in the seat 102.

At step 524, the user 104 is provided a prompt to provide a selection of the type of contouring to be executed. For example, the user 104 can be provided a prompt to initiate interactive seat contouring, as discussed with respect to FIG. 5B, automatically adjusting the seat contour as discussed with respect to FIG. 4, or manual seat adjustment by the user themselves. In some embodiments, the computing environment 106 recommends a posture for the user 104 to take and then adjusts the seat 102 based on the user 104 repositioning themselves to the recommended posture.

At step 512, the process 500 detects a regional pressure increase by the user 104. A regional pressure increase change occurs when the computing environment 106 determines that a zone or zones within the seat 102 have accumulated more pressure than the others. In some embodiments, the high-pressure zones are compared to a baseline pressure map saved to the user profile. The baseline can be created from any of an interactive seat adjustment, automatic seat contouring, or a manually adjusted seat setting created by the user 104.

At step 526, in some embodiments, slow, subtle "micro adjustments" can be implemented to the seat 102 contouring to try to combat pressure increases without alerting the user 104. For example, over a longer period, small reductions to pressure in higher pressure bladders 312 is implemented. As bladders 312 are updated, the system 100 can recalibrate comfort of the user 104 accordingly. The micro adjustments can be made prior to a regional pressure increase is triggered as a preventative measure or the micro adjustments can be implemented in response to a regional pressure increase trigger. In case of pressure, for example, the seat could better distribute the pressure via micro-adjustments over a long period of time. The seat could also suggest a unique treatment, whether relaxing or energizing, based on emotional detection, whether via a camera system and/or the analysis of biometric inputs.

At step 528, the process 500 determines whether the increased pressures persist. In some embodiments, the persistent regional pressure increase is determined by comparing the pressures to the baseline after the micro adjustments (or other mitigating changes) have been implemented. If the regional pressure increase persists then the process 500 advances to step 530, otherwise the process 500 advances to step 536.

At step 530, one or more treatments are recommended to the user 104. The user 104 can elect to select one of the recommended treatments or decline the treatment suggestions, which will end the process at step 536. In some embodiments, the recommended treatments include a selection from adjusting seat contour as provided in FIG. 4 or 5B, a pneumatic massage, vibration massage, music massage, a biometric massage as provided in FIG. 6), heartrate-based stress relief as provided in FIG. 7, music massage as provided in FIG. 8, an interactive exercise as provided in FIGS. 9 and 10, yoga as provided in FIG. 11, or heating/cooling treatment as discussed in greater detail herein.

At step 532, the process 500 receives the treatment selection from the user 104. The user 104 can select a number of the treatments and some treatments can be combined. The treatments can include any combination of the treatments discussed with respect to FIGS. 5B-12. For example, the user 104 can use the HMI in a vehicle to select a music massage. Once the selection is received from the user 104, the computer environment 105 will execute the corresponding treatment. Continuing the example, the selection of the music massage will trigger the process 800 in FIG. 8 to be executed.

At step 534, the process 500 prompts the user 104 if the user 104 wants to save the triggered user discomfort conditions and corresponding treatment selection. If the user 104 elects to save the history, the discomfort conditions and corresponding treatment is saved in the user profile. For example, if the user 104 selected music massage to relieve high pressure points, that preference is saved in the user's profile.

In some embodiments, step 534 includes activating a setting in the user profile such that the user 104 is not prompted to save the history every time an event triggers. Instead, a preference that all data is saved, no data is saved, or some combination of data is saved is provided to the user 104. In some embodiments, preset preferred treatments for the different triggered user discomfort conditions are provided to the user or the computing environment 106 can use AI/machine learning to determine which treatment the user 104 prefers and/or is the most effective in alleviating the issue, as discussed in great detail herein. Similarly, the computing environment 106 can use AI/machine learning to use recorded option selections of the user 104 to tailor a shorter menu of treatments in the future. For example, if the user 104 never selects music massage, it is removed from the recommended treatments displayed to the user 104.

At step 514 the process 500 detects high pressure points on the user 104. High pressure points occurs when pressure levels within a zone or zones exceed a predetermined level, defining an unacceptable peak pressure. A trigger for high pressure points can be triggered based on a single pressure sensor or a zone or region of pressure sensors, depending on a level of sensitivity desired. Once a trigger for high pressure points is initiated, the process proceeds to step 526 and the corresponding steps, as discussed above.

At step 516 the process 500 detects fidgeting of the user 104. In some embodiments, fidgeting is detected by identifying a series of mini pressure shifting in seat 102 (to a lesser degree than posture change). Once a trigger for fidgeting is initiated, the process proceeds to step 530 and the corresponding steps, as discussed above. Depending on the configuration, fidgeting is triggered when the user 104 is nervously fidgeting or fidgeting due to discomfort. Depending on the type of fidgeting, the recommended treatment may be different. For example, for fidgeting due to discomfort, the automated or interactive seat contouring processes may be recommended, whereas for nervous fidgeting, the games or yoga processes may be recommended to help calm the user 104.

In some embodiments, other forms of treatment are provided including, for example, cycling comfort profiles, adjusting the seat 102 for new posture, coaching the user 104 through stretching exercises (e.g., via the display 112 or user device 114), among others. In some embodiments, onboard cameras and analytics are used to provide feedback based on visual characteristics of the user 104 and update the AI/machine learning for contouring, treatment recommendations, etc. based on the visual characteristics. For example, a camera and analytics visualize the user 104 after adding firmness to the bladders 312. If facial characteristics of the user 104 indicate user discomfort, the computing environment 106 changes the contouring again and updates the user profile for future changes.

At step 536 the process 500 ends or returns to the monitoring comfort state at step 506. Once a treatment has been proposed or enacted, the result of the treatment is measured to assess wellness and comfort. The treatment and wellness assessment can be performed using various methods. For example, the treatment and wellness assessment can include validating a user experience based on biometrics, visual analysis of the user 104, and subjective survey feedback from the user 104. In one example embodiment, a camera and analytics are used to determine if the treatment is having a positive effect on the user 104. Similarly, physiological data can be referenced to determine if the user 104 is more or less relaxed after implementing changes and/or treatments. In some embodiments, the feedback provided through these analyses is used to update the AI/machine learning (e.g., training models).

In operation, the processes 500 and 530 can be carried out automatically when the user 104 sits in the seat 102. Once seated, an initial user pressure and posture assessment is performed to personalize seat adjustments based, at least in part, on the size and shape of the user 104. After the assessment is complete, the conditions of the seat 102 (e.g., pressure sensors 324) and physiological data of the user 104 are continuously monitored to determine if a discomfort condition is triggered. This involves continuous monitoring of the comfort, wellness, and emotional states of the user 104 occupying the seat 102. Monitoring is performed using a variety of physiological parameters such as pressure, fidgeting detection, temperature, facial expression, and posture detection.

If a discomfort condition is triggered, the computing environment 106 initiates mitigation action, such as slowly adjusting the seat 102 in the background or making adjustments to the seat 102 positions/pressures. Additionally, the computing environment 106 can automatically trigger or recommend treatments including, for example, unique variations of massage patterns in conjunction with adjustments in seat contouring, seat-to-occupant interface temperature and airflow, seat-to-occupant interface pressure, and overall posture. The continuous monitoring, background contouring, and treatment recommendations are tailored to the specific user 104 and configured such that the user 104 is afforded long term comfort during long periods of being seated. The process 500 also records historical comfort settings (e.g., in the user profile) provided by the user 104 and machine learning can be used to further optimize recommendations in the future.

Figure 6:
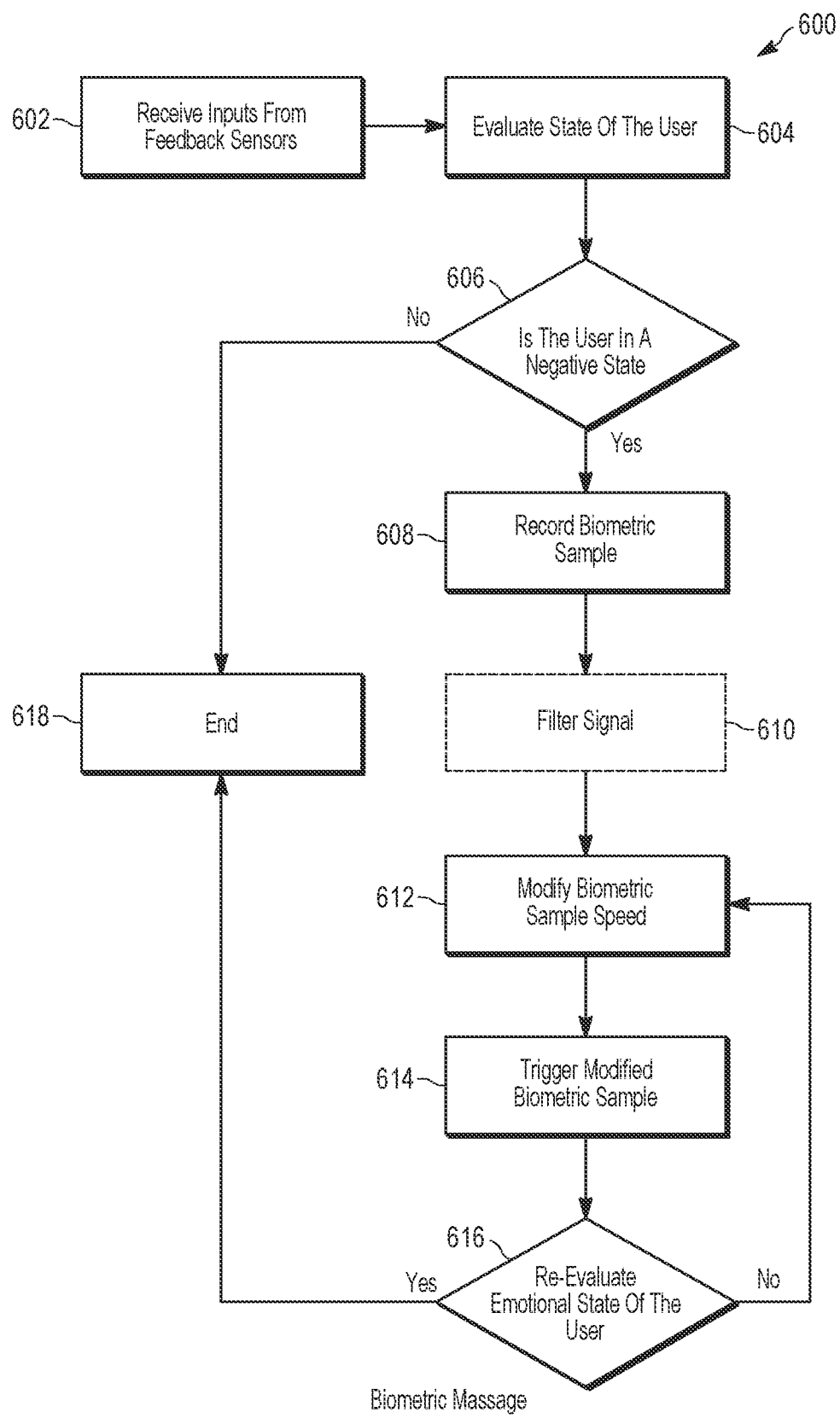
FIG. 6 is a flowchart of a method for implementing biometric massage in accordance with some embodiments.

FIG. 6 illustrates a flow chart depicting an example process 600 for operation of the seat 102. The process 600 provides steps for performing a biometric massage treatment using the seat 102. The biometric massage is one of the treatment options that can be recommended to the user 104 to relieve stress, discomfort, and/or keep the user active and engaged in an activity (e.g., driving). In some embodiments, the biometric massage leverages biometric signals (or physiological signals) from the seat 102, user devices 114 (e.g., wearable devices), and/or the surrounding area (e.g., vehicle) to determine a physical, mental, and/or emotional state of the user 104. With the state of the user 104 determined, the process 600 is used to provide a treatment to the user 104 depending on user preferences. In some embodiments, the biometric signals themselves are used during the treatment. For example, example, heart rate, heart rate variability (HRV), breathing rate, etc., biometric signals are processed and used to generate an interface stimulus, such as the haptic feedback subsystem 234 to affect the state of the user 104.

At step 602, the process 600 receives inputs from a plurality of feedback devices 110. The feedback devices 110 include biometric sensors, physiological sensors, or other devices capable of capturing physiological data. Examples of biometric signals/physiological data include heart rate, heart rate variability, blood glucose, blood pressure, respiration rate, body temperature, blood volume, sound pressure, photoplethysmography, electroencephalogram, electrocardiogram, blood oxygen saturation, energy expenditure, and skin conductance. In some embodiments, the feedback devices 110 provide historical data for more robust analysis. The computing environment 106 stores, processes, and retrieves historical biometric signals/physiological data (e.g., in memory 122, storage system 108, user device 114, etc.). In some embodiments, the computing environment 106 analyses historical tracking data to evaluate the user 104 throughout the time the use is seated duration in the seat 102.

In some embodiments, the seat 102 includes one or more feedback devices 110. For example, the seat 102 can include skin contact sensors for monitoring galvanic skin response (GSR) and an electrocardiogram (EGG) for monitoring a heartbeat. Data from the feedback devices 110 are provided to the computing environment 106 using various methods. In one example, the feedback devices 110 are wirelessly paired with the computing environment 106 such that when the feedback devices are within range of the computing environment 106, biometric signals/physiological data are sent shared.

At step 604, the biometric signals/physiological data is analyzed to determine one or more states of the user 104 in the seat 102. The analysis can include a combination of logic, AI, machine learning, etc. to determine one or more of a physical state, mental state, and/or emotional state of the user 104. Monitoring biometric signals/physiological data allows for detection of deviations from previously established ideal metrics.

Figure 7:
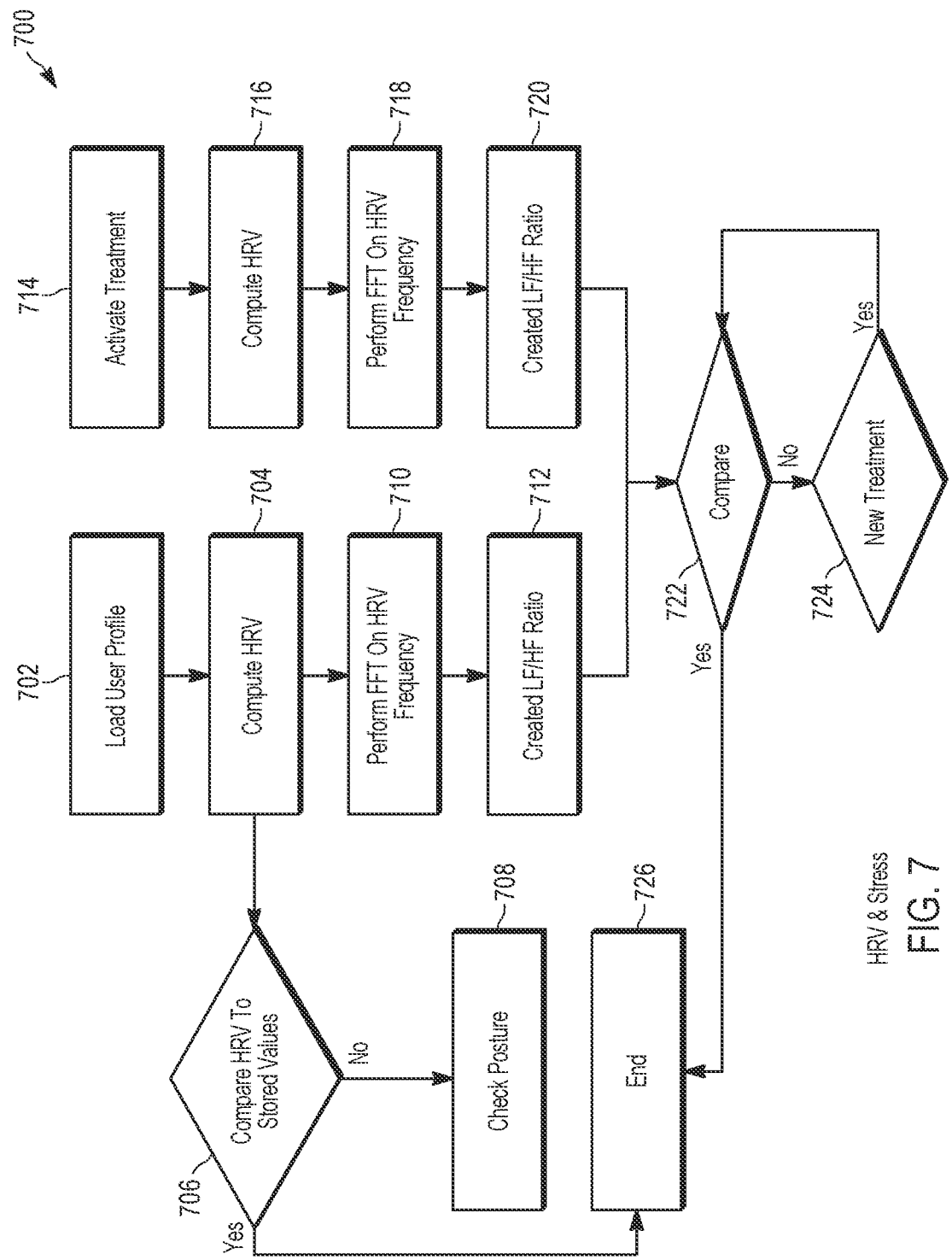
FIG. 7 is a flowchart of a method for heart rate variability (HRV) and stress analysis in accordance with some embodiments.

At step 606, the process 600 determines whether the user 104 is in a negative state. In this example, the computing environment 106 uses the biometric signals/physiological data to determine whether the user 104 is tired, agitated, anxious, etc. or energized, happy, normal, etc. Various methods can be used to determine the state of the user 104. In some cases, the HRV and Stress process 700 discussed with respect to FIG. 7 are used to determine a state of the user 104.

Continuing with step 606, if the process 600 determines that the user 104 is not experiencing any negative states, the process 600 advances to step 618 and ends. In some embodiments, the process 600 suggests or performs a treatment based on the measured deviations and/or the negative state of the user 104. In one example, the treatment includes a biometric massage.

At step 608, a biometric signal sample is recorded. The biometric signal sample can be recorded in real-time or it can be a previously recorded sample associated with the user 104, another user, or machine generated. In some embodiments, the biometric signal sample includes signals related to breathing or heartrate of the user 104. For example, a heartbeat signal for the user 104 is recorded. The recorded sample can be recorded for a predetermined length. For example, the recorded sample can be about 30 seconds. In some embodiments, the recorded sample length is edited to be looped. For example, for a recorded heartbeat the time between beats at the end of the recording and the beginning of the recording are substantially the same as the time between beats in the middle of the recording.

At step 610, the recorded signal is filtered. In some embodiments, the filtering includes breaking down the signal target data elements. For example, the signal can be filtered to isolate the heartbeat or heartrate of the user 104 in a usable format (e.g., to create haptic feedback simulating the HR).

At step 612, the speed of the recorded biometric signal sample is modified. The biometric signal sample speed can be increased or decreased depending on the desired treatment for the negative state identified in step 606. For negative states related to stress, anxiety, etc. the biometric sample is modified to slow down. For example, the recorded biometric signal can be slowed down by about 80% of the original speed. For negative states related to drowsiness, low energy, etc. the biometric sample is modified to speed up. For example, the recorded biometric signal can be sped up by about 20% of the original speed to stimulate the user 104. The modified biometric signal is stored (e.g., in memory 122, storage system 108, user device 114, etc.) for future usage. In some embodiments, the speed of the modified biometric sample is increased or decreased gradually over a predetermined period of time. For example, the speed of the recorded biometric sample can be adjusted (increased/decreased) by about 5% over a first period of time, then adjusted again in 5% increments over subsequent periods of time. The incremental increases are provided such that they are subtle and less perceivable by the user 104 while providing the same impact at the end of the treatment.

In some embodiments, the step 612 can be implemented to speed up or slow down other treatments in the seat 102. For example, pneumatic massage, vibration massage, music massage, etc. programs can be sped up or slowed down in response to detected negative state (i.e., stress, drowsiness).

At step 614, the desired modified biometric sample is triggered for "playback" on the seat 102. In some embodiments, as part of the "playback" at least one of the haptic feedback subsystem 234, temperature subsystem 236, and the A/V feedback subsystem 238 are activated to mimic the biometric signal. For example, for a heartrate biometric signal, one or more haptic actuators or speakers in the haptic feedback subsystem 234 and the A/V feedback subsystem 238 are activated to match the modified heartbeat rate, such that the perception of the user is that they are feeling their own heart rate. In another example, for a breathing biometric signal, at least one of the plurality of the bladders 312 can be pressurized and depressurized to mimic chest movements during breathing.

In some embodiments, one or more of the subsystems are activated to supplement the mimicked biometric signal. For example, if the user 104 is determined to be stressed, the subsystem 236 activates cooling within the seat 102 to assist in calming the user 104. The subsystems can be activated at a number of combinations of locations within the seat 102 to provide the desired effect. In one example, for a heartrate biometric signal, the haptic feedback devices 318 situated behind the user's 104 chest are activated. In some embodiments, the modified biometric signal, and corresponding subsystem effects are activated for a predetermined period of time. For example, the subsystems can be activated for 5-10 minutes. The type of detected condition and the severity can affect which treatment is provided and the duration/intensity of the mimicked biometric signal during the biometric massage treatment.

At step 616, the process 600 determines whether the user 104 is still in a negative state. Similar to step 606, the computing environment 106 can determine whether the user 104 is still tired, agitated, anxious, etc. or energized, happy, normal, etc. using the biometric signals/physiological data. The process 600 can re-evaluate for the same negative state identified in step 606 or it can re-evaluate for all potential negative states. In some embodiments, the new biometrics of the user 104 are re-evaluated by comparing them to a baseline biometric of the user 104 when the user 104 is in a healthy "normal" state.

In some embodiments, the process 600 assesses success of the biometric massage treatment by comparing biometric signals measured before, during and after treatment to target data based on existing profile/historical data. Various methods can be used to determine the state of the user 104. For example, the HRV and Stress process 700 discussed with respect to FIG. 7 can be used. If the negative state has returned to within a normal threshold, for the user 104, the process 600 ends. In some embodiments, if the negative state has not returned to within a normal threshold, for the user 104, the process 600 returns to step 612 and the biometric sample is further modified. In some embodiments, the user 104 is prompted to stop, continue, or select a different type of treatment. For example, if user 104 used the haptic response, they may rather choose a pneumatic response, at this time. If the received user input is to continue treatment, then the process modifies the current treatment. For example, if the biometric sample was originally slowed down, it will be slowed down further and if the biometric sample was originally sped up, it will be sped up further. For example, the biometric signal can be slowed by 55% of the original recorded speed.

At step 618 the process 600 ends. The ending process can include terminating the process 600, returning to the process calling the process 600 (e.g., process 500) or returns to step 604 for continuous monitoring of the user 104. Once a treatment has been proposed or enacted, the result of the treatment is measured to assess wellness and comfort. The treatment and wellness assessment can be performed using various combinations of methods. In one example, the treatment and wellness assessment includes validating a user experience based on at least one of biometrics, visual analysis of the user 104, and subjective survey feedback from the user 104. In one example embodiment, a camera and analytics are used to determine if the treatment is having a positive effect on the user 104. Similarly, physiological data can be referenced to determine if the user 104 is more or less relaxed after implementing changes and/or treatments. In some embodiments, the feedback provided through these analyses is used to update the AI/machine learning (e.g., training models).

In operation, for a biometric massage, one or more biometric signals are captured from the user 104 occupying the seat 102 and simulated feedback based on the one or more biometric signals is generated in the seat 102. The one or more biometric signals are modified to be faster or slower based on the effect wanted on the user 104. This combination of effects provides a personalized comfort experience that may provide mood enhancement, promote mental health, and aid in preparing the user 104 for a desired activity. The process 600 also provides the ability to influence the state of the user 104 through the use and processing of biometric signals and using the biometric signals as input to haptic motors, bladders 312 or other systems within the seat 102 or surrounding environment that interface directly with the user 104.

Referring to FIG. 7, a flow chart depicting an example process 700 for evaluating biometric/physiologic data is depicted. The process 700 provides steps for performing heart rate variability and stress analysis. The heart rate variability and stress analysis are one of metrics for determining a state of the user 104. The process 700 can be used to provide biometric data for use in other processes discussed herein. In some embodiments, the process 700 is implemented using a combination of the physiological sensor subsystem 232 and the haptic feedback subsystem 234. The physiological sensor subsystem 232 is used to capture biometric/physiologic data and the haptic feedback subsystem 234 is used to provide the biometric massage elements.

At step 702, the process 700 receives inputs from one or more feedback devices 110 and data populated in the user profile, for example, in memory 122, storage system 108, and/or user device 114. Additionally, the computing environment 106 can store and retrieve information about the user 104 (e.g., in memory 122, storage system 108, user device 114, etc.). The biometric data and the user information are combined to establish the metrics for evaluating the user 104. In some embodiments, the feedback device 110 is an ECG and the user information includes age, gender, and fitness level of the user 104.

At step 704, a first HRV is calculated by the computing environment. The first HRV can be calculated using known methods to determine the time intervals between heart beats. The first HRV can be calculated over a predetermined period of time, such as for example, five minutes. In some embodiments, the first HRV is calculated while the user 104 is relaxing.

At step 706, the calculated first HRV from step 704 is compared against a standardized HRV value typical for the user 104. The standardized HRV value can be predetermined values that are stored in the computing environment 106 (e.g., in memory 122, storage system 108, user device 114, etc.) and are specific to a person having the age, gender, and fitness level as the user 104. In some embodiments, the standardized HRV value can be pulled from a lookup table.

If the comparison determines that the HRV values are similar, then the calculated first HRV values are normal no further processing is necessary and the process 700 advances to step 728. If the comparison results in inconsistencies between the predetermined HRV value and the calculated first HRV of the user 104, then the process 700 advances to step 708.

At step 708, a posture of the user 104 is checked. The posture 104 of the user can be evaluated using a combination of systems and methods. For example, posture could be detected via interface pressure, in line pressure sensors, vision systems, etc. In some embodiments, different postures for the user 104 are evaluated for their effectiveness. For example, the posture can be evaluated to assess its effect on the HRV of the user 104.

At step 710, the calculated first HRV value is used to perform a Fast Fourier Transform (FFT) on the calculated HRV frequency. The FFT is used to converts the first HRV signal into individual spectral components to provide the frequency information about the first HRV signal.

At step 712, a low frequency (LF) and high frequency (HF) values are calculated from the FFT of the first HRV signal to create a first LF/HF ratio. A high ratio may indicate that the user 104 is experiencing discomfort or stress. A low ratio may be an indication of no or minimal discomfort or stress or "normal."

At step 714, a treatment is activated via the seat 102 to treat the user 104. The treatment can include any of the treatments discussed herein, for example, any of the processes from FIGS. 4-6 and 8-12.

At step 716, a second HRV is calculated by the computing environment. The second HRV can be calculated using any known methods to determine the time intervals between heart beats. The second HRV can be calculated over a predetermined period of time, such as for example, five minutes.

At step 718, the calculated second HRV value is used to perform a Fast Fourier Transform (FFT) on the calculated HRV frequency. The FFT is used to convert the second HRV signal into individual spectral components to provide the frequency information about the second HRV signal.

At step 720, a low frequency (LF) and high frequency (HF) values are calculated from the FFT of the second HRV signal to create a second LF/HF ratio. A high ratio may indicate that the user 104 is experiencing discomfort or stress whereas a low ratio may be considered more normal.

At step 722, the first HRV ratio and the second HRV ratio are compared. The comparison provides an indication of whether the treatment is providing an improvement to the user's 104 emotional state. In some embodiments, the process 700 determines whether the treatment is effective and/or if a new treatment should be selected.

At step 724, the change in physical/emotional state is displayed and a prompt id provided to the user 104 with selections to either continue treatment or select a new treatment. For example, a pictorial representation of emotional state of the user 104 is rendered and displayed to the user 104 showing their sate before, during, and after treatment along with an indication as to where their state should be. An input is received from the user 104 from the prompt and the process 700 advances to step 726 if the selection is to start a new treatment, to step 722 if the selection is to continue the previous treatment, and step 728 if the selection is to end treatment.

At step 726, the user 104 is prompted to select a new treatment. For example, the process 700 can render to the user 104, on the display 112 or user device 114, options for selections of a new treatment. The new treatments can be recommendations based on a combination of user preferences (e.g., from user profile) and AI/machine learning based on historical data.

At step 728 the process 700 ends. Ending the process 700 can include terminating the process, returning to the process 600, or returns to steps 704 and 716 for re-evaluation. In some embodiments, once a treatment has been proposed or enacted, the result of the treatment is measured to assess wellness and comfort. The treatment and wellness assessment can be performed using a combination of methods. For example, the treatment and wellness assessment can include validating a user experience based on at least one of biometrics, visual analysis of the user 104, and subjective survey feedback from the user 104. In one example embodiment, a camera and analytics are used to determine if the treatment is having a positive effect on the user 104. Similarly, physiological data can be referenced to determine if the user 104 is more or less relaxed after implementing changes and/or treatments. In some embodiments, the feedback provided through these analyses is used to update the AI/machine learning (e.g., training models).

Figure 8:
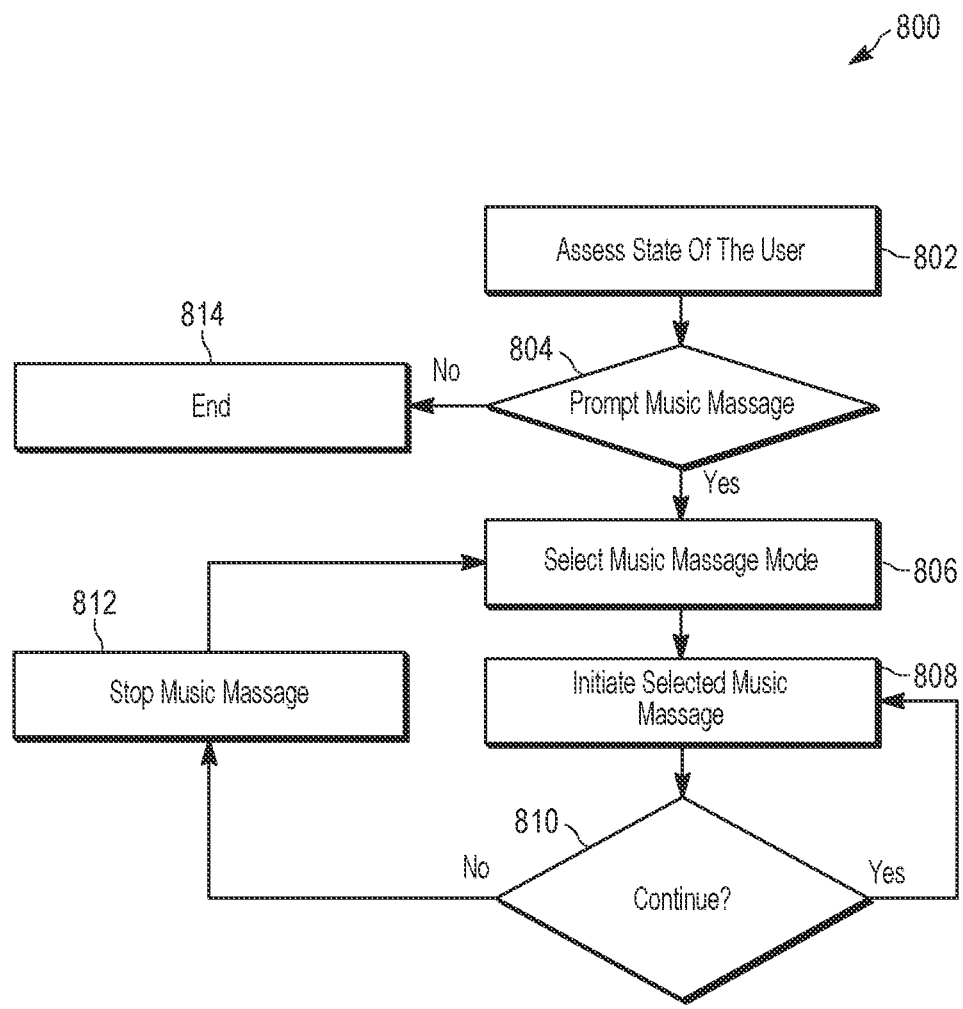
FIG. 8 is a flowchart of a method for implementing music massage in accordance with some embodiments.

FIG. 8 illustrates a flow chart depicting an example process 800 for providing a music-based massage to the user 104 is depicted. The process 800 provides steps for implementing the music-based massage using the seat 102. The music-based massage can be provided as a form of treatment, as discussed with respect to FIGS. 4-6 or can be used as entertainment. Initially, the process 800 receives inputs of biometric data and emotion recognition from the user 104. The biometric data can include biometric or physiological data as discussed herein and the emotion recognition can be derived using a camera to capture an image of the face of the user 104 and performing analysis on the captured image.

At step 802, the process 800 assesses the state of the user 104, for example, a physical, mental, and/or emotional state determined using the biometric or physiological data and emotion recognition. In some embodiments, the state of the user 104 provides an indication of boredom, tiredness, stress level, and happiness.

At step 804, the process 800 prompts the user 104 if they would like to initiate a music-based massage. The prompt can be provided via the display 112 or user device 114 and include, for example, a graphical icon or other mechanism configured to notify the user 104 that a music-based massage may be selected. In some embodiments, the prompt is triggered in response to the state of the user 104. For example, if the user 104 is stress or tired, the computing environment 106 may recommend that the user 104 participate in a music-based massage to relax. If the user 104 declines participating in the music-based massage, the process 800 advances to step 814 and ends. If the user 104 accepts participating in the music-based massage, the process 800 advances to step 806.

At step 806, the user 104 is provided with a prompt with music-based massage modes for selection. The music-based massage modes are based on different moods, for example, energizing, fun, happy, other, etc. The music-based massage mode can also be selected based on song or music genre. In some embodiments, each of the modes/moods is associated with one or more preprogrammed songs or playlists that are synchronized with one or more haptic feedback elements of the seat 102 for an overall massage-based experience. The user 104 can select one of the music-based massage modes depending on which provided moods are appealing at a given point in time. In some embodiments, the process 800, via the computing environment 106, provides one or more selection mechanisms so that the user 104 can select a custom song, mood, or playlist manually or from their existing user profile. In some embodiments, an upload mechanism is provided so that the user 104 can upload their own pre-programmed music-based massage including songs and the type, rate, intensity, etc. feedback provided by the seat 102.

At step 808, the selected music mode is activated based on selection made by the user 104. For example, if a user 104 wants to feel more energized, the user 104 can select the energizing music-based massage mood. Activation will cause the seat 102 to provide haptic feedback to the user 104, the haptic feedback corresponding to the selected music. In some embodiments, at least one of the haptic feedback subsystem 234, temperature subsystem 236, and the A/V feedback subsystem 238 are activated to provide the haptic feedback. For example, an energizing mood, one or more haptic actuators, bladders 312, massage bladders 314, feedback devices 316, or speakers in the haptic feedback subsystem 234 and the A/V feedback subsystem 238 are activated/deactivated in sync with the music to provide the music-based massage experience. In some embodiments, music selection can be recommended based on tempo and tones of the music and how they may impact a state of the user 104. For example, flat keys are generally more associated with sad/down mood states. In some embodiments, video can be provided to accompany the music, for non-driver users. For example, video with links with the desired effect can be displayed to the user 104, such as a music video for the song.

In some embodiments, the music-based massage operates with audio imported from an outside source, such as a vehicle radio or user device 114. The music signal can be filtered, if needed, and transmitted to the seat 102 for output devices such as bladders and/or haptic feedback devices. The filtering can include modifying the signal from music to a format that is actionable by the respective feedback devices. For example, bass notes of a song can be isolated as activation signals for one or more bladders to be activated substantially simultaneous to the bass notes as they are played on the speakers. In some embodiments, the selected music-based massage operates for a predetermined period of time. In one example, the music-based massage operates for one song at a time.

At step 810, the process 800 prompts the user 104 if they would like the music-based massage to continue with another song in the same mood, genre, etc. If a yes selection is received, the process 800 returns to step 808 and the next song is played with the music-based massage. If a no selection is received, the process 800 advances to step 812.

At steps 812 and 814, the music-based massage is stopped. In some embodiments, after stopping the music-based massage, the process 800 returns to step 806. Once a music-based massage has been performed, the result of the music-based massage is measured to assess wellness and comfort of the user 104. The treatment and wellness assessment is performed, for example, based on at least one of biometrics, visual analysis of the user 104, and subjective survey feedback from the user 104. In one example embodiment, a camera and analytics are used to determine if the music-based massage is having a positive effect on the user 104. Similarly, physiological data can be referenced to determine if the user 104 is more or less relaxed after implementing the music-based massage. In some embodiments, the feedback provided through these analyses is used to update the AI/machine learning (e.g., training models).

In operation, the user 104 selects a preprogrammed song for a music-based massage performed by the seat 102. The haptic feedback elements of the seat 102 are activated based on the preprogrammed song to create a synchronous haptic feedback response along with the music (e.g., music rhythm, beat, etc.). This combination of effects provides a tangible way to enjoy music along with a unique synergy with haptic massage elements to provide the user 104 with, among other things, enhanced comfort. The process 800 also provides the ability to influence the state of the user 104, to enhance user experience, to build a direct correlation between a specific music track and a unique emotional state of the user 104, and the ability to create a personalized music library based on favorite songs and an effect on the emotional state on the user 104.

Figure 9:
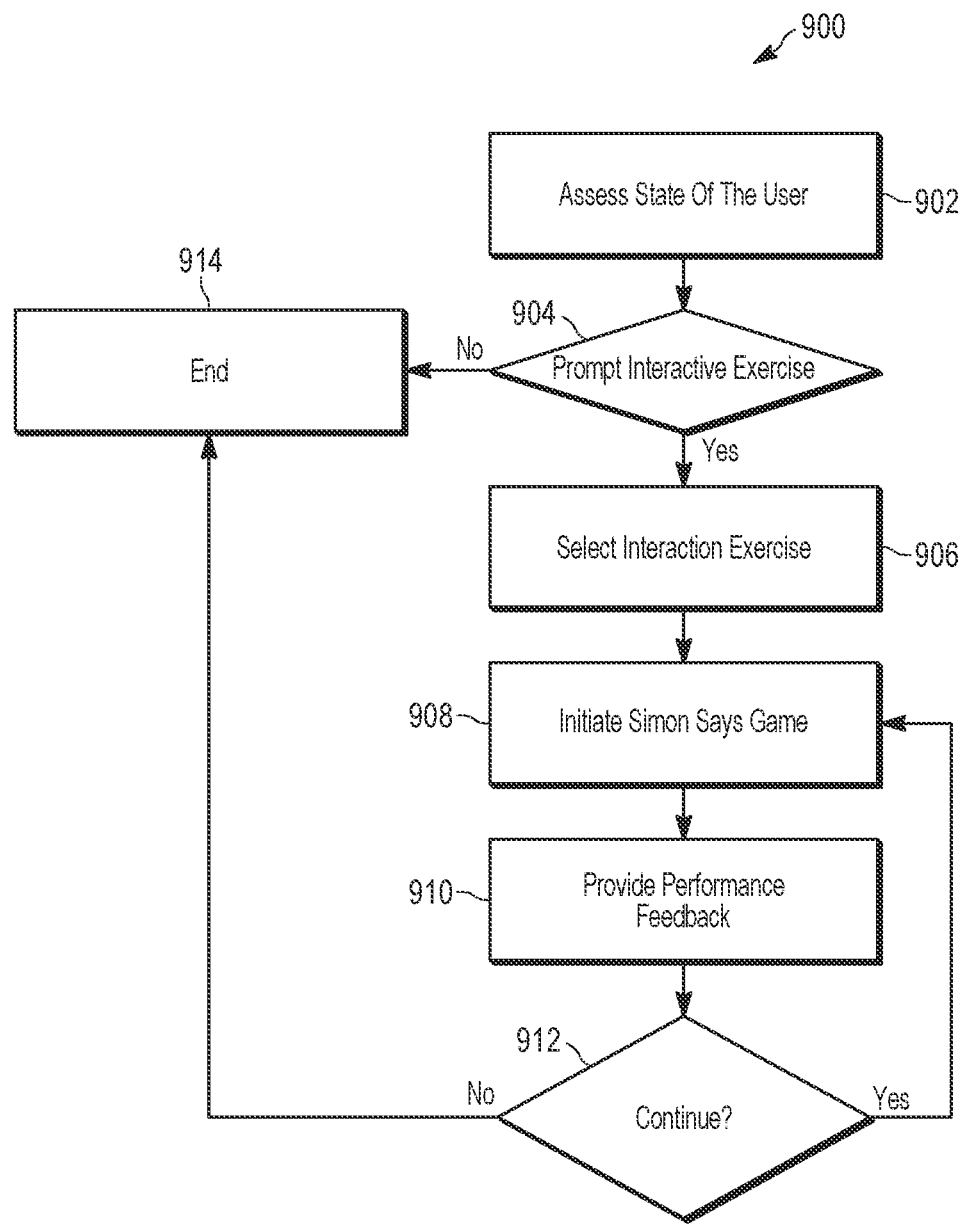
FIG. 9 is a flowchart of a method for implementing a game (e.g., Simon Says) in accordance with some embodiments.

Referring to FIG. 9, a flow chart depicting an example process 900 for interacting with the user 104 in a game is illustrated. In this example, a version of the game Simon Says is implemented. The game of Simon Says can be provided as a form of treatment, as discussed with respect to FIGS. 4-6 or can be used as entertainment. Initially, the process 900 receives inputs of biometric data and emotion recognition from the user 104. The biometric data and emotion recognition can obtained using techniques already described.

At step 902, the process 900 assesses the state of the user 104. The state can include physical, mental, and emotional states determined based on the biometric or physiological data and emotion recognition. The state of the user 104 can include the states previously described.

At step 904, the process 900 prompts the user 104 if they would like to initiate an interactive exercise or game. The prompt can be provided using the mechanisms and techniques already described. For example, the display 112 or user device 114 can display a notification prompting the user 104 about the available interactive exercises, including Simon Says. In some embodiments, the prompt is triggered in response to the state of the user 104. For example, if the user 104 is stress or tired, the computing environment 106 may recommend that the user 104 participate in an interactive exercise to relax. If the user 104 declines participating in the Simon Says, the process 900 advances to step 914 and ends. If the user 104 accepts participating in the Simon Says, the process 900 advances to step 906.

At step 906, the user 104 is provided with a prompt with available interactive exercises for selection. Each of the interactive exercises are associated with one or more activities that are synchronized with one or more haptic feedback elements of the seat 102 for an interactive experience. The user 104 can select one of the interactive exercises depending on which is most appealing at a given point in time. In process 900, the selected interactive exercise is playing a version of Simon Says.

At step 908, the interactive exercise for Simon Says is initiated. During gameplay of Simon Says, in some embodiments, sound from the seat 102 or the seat 102 surroundings (e.g., vehicle speakers, user device 114, etc.) is played along with localized haptic feedback. In some embodiments, at least one of the haptic feedback subsystem 234, temperature subsystem 236, and the A/V feedback subsystem 238 are activated to provide the haptic feedback. For example, one or more haptic actuators, bladders 312, or speakers in the haptic feedback subsystem 234 and the A/V feedback subsystem 238 are activated/deactivated in localized areas. The haptic feedback is provided in localized areas such that a user 104 can clearly identify what part of the seat 102 is being activated. In some embodiments, the localized areas including the haptic feedback includes the left and right shoulders and left and right thigh locations on the seat 102. During gameplay, a randomized pattern of different activated locations is executed. In response to identifying the location on the seat, the user 104 can respond by applying pressure (sensed by pressure sensors 324 or other sensors) to try to recreate the pattern. To continue playing the game, the user 104 must press into the seat 102 following the location and sequence of the haptic feedback provided by the seat in the previous cycle.

At step 910, the process 900 determines whether the user's 104 entered sequence matches the sequence provided by the seat 102 and provides the appropriate feedback. If the user 104 failed to match the pattern provided by the seat 102, then a negative response can be provided. In one example, the computing environment 106 provides a graphic indicating that the pattern did not match and to try again. If the user 104 successfully matches the pattern provided by the seat 102, then a positive response is provided and the next cycle begins. In one example, the computing environment 106 provides a graphic indicating that the pattern matched and renders a celebratory graphic (e.g., fireworks, gold star, etc.). During gameplay, the prompts and outputs can be provided via the display 112, user device 114, HMI, etc. In some embodiments, data related to the gameplay can be stored for access by the user 104 and/or the process 900. For example, a user level, high scores, etc. can be stored (e.g., in the user profile) and accessed by the user 104.

At step 912, the process 900 prompts the user 104 if they would like to continue playing Simon Says. If the received selection is yes, the process 900 returns to step 908 and the next round of play begins. If the received selection is no, the process 900 advances to step 914. In some embodiments, when the user 104 is finished playing the game, additional information is displayed to the user 104. For example, a player score, rounds completed, and fitness details such as total calories, average heart rate, etc. are displayed to the user 104.

At steps 914, the Simon Says game is stopped. In some embodiments, after stopping the game, the process 900 returns to step 904 for a different interactive exercise selection or exiting the menu. Once an interactive exercise has been performed, the result of the interactive exercise is measured to assess wellness and comfort of the user 104. The treatment and wellness assessment can be determined based on at least one of biometrics, visual analysis of the user 104, and subjective survey feedback from the user 104 using techniques and mechanisms already described with respect to other comfort features. As was also described with respect to other comfort features, in some embodiments, the feedback provided through these analyses is used to update the AI/machine learning (e.g., training models).

Figure 10:
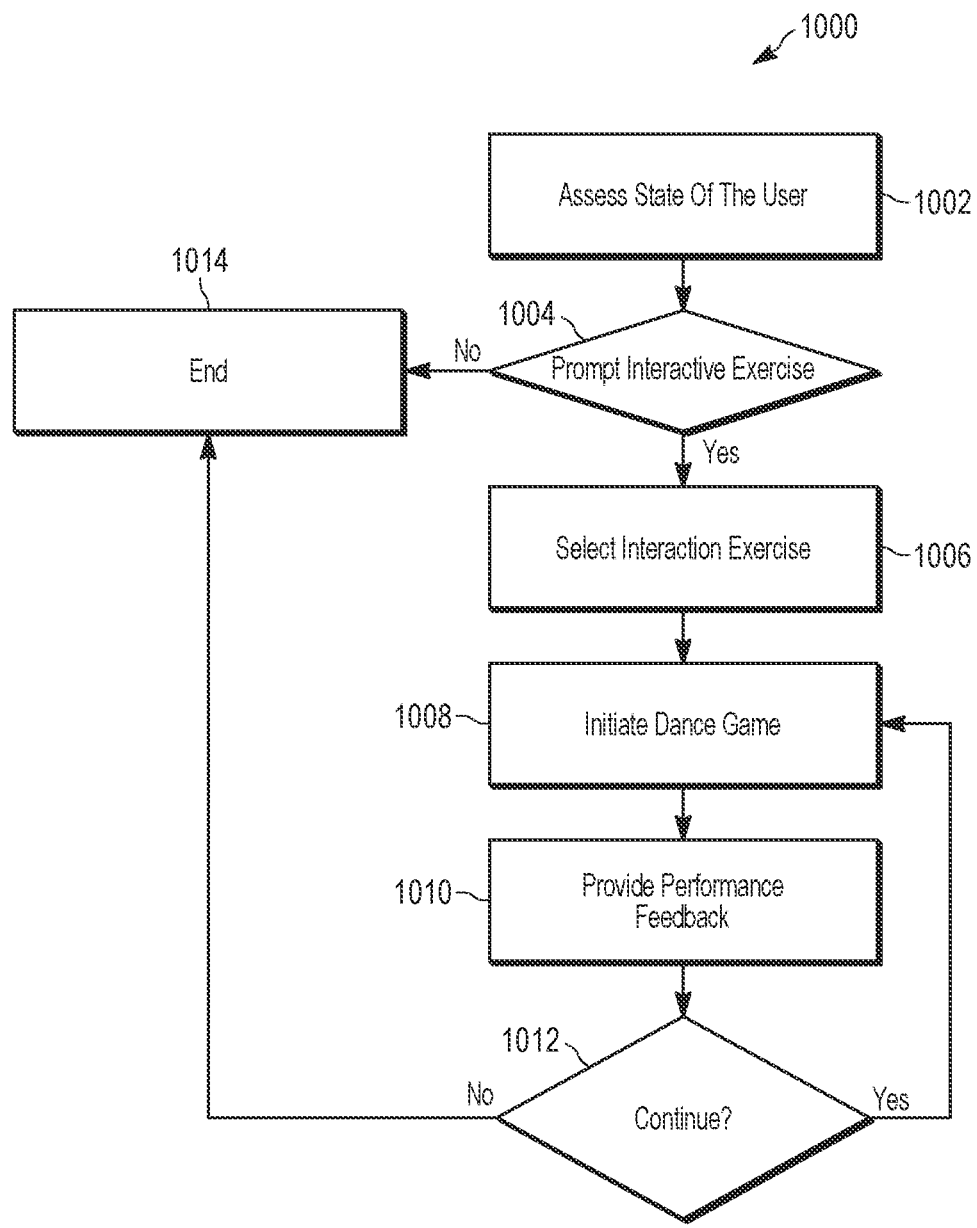
FIG. 10 is a flowchart of a method for implementing a dance simulator in accordance with some embodiments.

Referring to FIG. 10, a flow chart depicting an example process 1000 implementing the dance game using the seat 102 is depicted. The dance game can be provided as a form of treatment, as discussed with respect to FIGS. 4-6 or can be used as entertainment. Initially, the process 1000 receives inputs of biometric data and emotion recognition from the user 104. The biometric data can include any combination of biometric or physiological data as discussed herein and the emotion recognition can be derived using a camera to capture an image of the face of the user 104 and performing analysis on the captured image.

At step 1002, the process 1000 assesses the state of the user 104. The state can include any combination of physical, mental, and emotional states that can be derived using the biometric or physiological data and emotion recognition. In some embodiments, the state of the user 104 can include boredom, tiredness, stress level, and happiness. In some embodiments, the biometrics and state of the user is continuously monitored and updated during process 1000.

At step 1004, the process 1000 prompts the user 104 if they would like to initiate an interactive exercise. The prompt can be provided using, for example, the display 112 or user device 114. In some embodiments, the prompt is triggered in response to the state of the user 104. For example, if the user 104 is stressed or tired, the computing environment 106 may recommend that the user 104 participate in an interactive exercise to relax. If the user 104 declines participating in the Dance Simulator, the process 1000 advances to step 1014 and ends. If the user 104 accepts participating in the Dance Simulator, the process 1000 advances to step 1006.

At step 1006, the user 104 is provided with a prompt with available interactive exercises for selection. In process 1000, the selected interactive exercise is the Dance Simulator.

At step 1008, the interactive exercise for the Dance Simulator is initiated. In some embodiments, a level of difficulty of the game is selected. The level of difficulty can be manually selected by the user 104 or it can be automatically selected (or recommended) by the computing environment 106, based in part on historical data (past performances) and biometric data of the user 104. In one example, using the data from step 1004, if the user 104 has a higher heart rate measurement, the computing environment 106 recommends a lower difficulty rating than for a user 104 with a lower heart rate measurement. In some embodiments, one or more songs are selected for gameplay. The song(s) can be manually selected by the user 104 or the song(s) can be automatically selected (or recommended) by the computing environment 106, based in part on historical data (past performances) and biometric data of the user 104. In one example, using the data from step 1004, if the user 104 has a higher heart rate measurement, the computing environment 106 recommends songs with a lower level of intensity than for a user 104 with a lower heart rate measurement.

During gameplay of the Dance Simulator, in some embodiments, sound from the seat 102 or the seat 102 surroundings (e.g., vehicle speakers, user device 114, etc.) is played along with localized haptic feedback. In some embodiments, at least one of the haptic feedback subsystem 234, temperature subsystem 236, and the A/V feedback subsystem 238 are activated to provide the haptic feedback. In some embodiments, haptic feedback is enabled or disabled based on user preferences (e.g., stored in user profile).

During gameplay, a randomized pattern of arrows or other shapes is displayed to the user 104 (e.g., on HMI, display 112, user device 114, etc.). The arrows or other shapes correspond to dance moves the user 104 executes while occupying the seat 102. As the arrows or other shapes move from one side of the screen to the other, the user 104 has to mimic the move on the seat 102. In one example, the moving arrows or other shapes overlap with a stationary arrow on the top of the screen. To mimic the move, at the appropriate time (e.g., when shapes overlap the outline) the user 104 applies pressure to a particular portion of the seat 102 (detectable by the pressure sensors 324) following the location and sequence of the shapes being displayed.

At step 1010, the process 1000 determines whether the user's 104 entered sequence matches the sequence provided by the display and provides feedback. In some embodiments, each action or move by the user 104 is assessed independently and assigned an accuracy rating based on how accurate the response was with the timing. The computing environment 106 generates positive feedback and negative feedback to the user 104 based on the accuracy assessment. In one example, if the user 104 failed to match the pattern provided by the display, then a negative response is provided the user 104. For example, the computing environment 106 provides a graphic indicating that the user 104 failed to time their seat 102 pressure application with the corresponding on-screen shapes. If the user 104 successfully matches the pattern provided by the display, then a positive response is provided. For example, the computing environment 106 provides a graphic indicating that the user successfully timed their seat 102 pressure application with the corresponding on-screen shapes. In another example, if the user 104 as a run of successful moves they could then get a combo acknowledgment with additional praise or encouragement.

In some embodiments, the computing environment 106 displays, in real time, a level of success for each or many of the moves during the song along with a progress bar of how much success user has currently achieved. The amount of success may represent a percentage of the success needed to "complete" or "win" the song. For example, the computing environment 106 logs and displays perfect ("perfect") and partial success ("great", "great", "good", "almost") or failure ("boo") for the move depending on how off the timing was or if it was a "miss" completely.

At step 1012, the process 1000 prompts the user 104 if they would like to continue playing the Dance Simulator. If the received selection is yes, the process 1000 returns to step 1008 and the next round of play begins. If the received selection is no, the process 1000 advances to step 1014. In some embodiments, when the user 104 is done playing the game, additional information are displayed to the user 104. For example, count of graded contacts made (i.e., #"perfect's," good's . . . ), a final rating or performance grade for the song, a fitness rating, HR before and after song, estimated calories burned during the song, etc. can be displayed to the user 104.

At steps 1014, the Dance Simulator game is stopped. In some embodiments, after stopping the game, the process 1000 returns to step 1004 for a different interactive exercise selection or exiting the menu. Once an interactive exercise has been performed, the result of the interactive exercise is measured to assess wellness and comfort of the user 104. The treatment and wellness assessment can be performed using techniques previously described. In some embodiments, the feedback provided through these analyses is used to update the AI/machine learning (e.g., training models).

In operation, the user 104 selects an interactive game of Dance Simulator to be played using seat 102. Initially, before launching the Dance Simulator, the user 104 is asked if they would like to feel the music during the gameplay. If yes, the haptic feedback subsystem 234, temperature subsystem 236, and the A/V feedback subsystem 238 are activated to provide the haptic feedback in the music massage mode so the user 104 is able to feel the music while playing the game. A display provides graphics indicating when the user should make a movement and where, while being synced with music playing from an audio output. The pressure sensors 324 (or other sensors) of the seat 102 detect pressure being applied to the seat 102 by the user 104. Thereafter, the computing environment 106 determines whether the timing and location of the user's applied pressure matches the patterns provided on display to the user 104. The interactive gameplay provided by the Dance Simulator provides entertainment, mood enhancement, and promotes physical health and wellness through activity.

Figure 11:
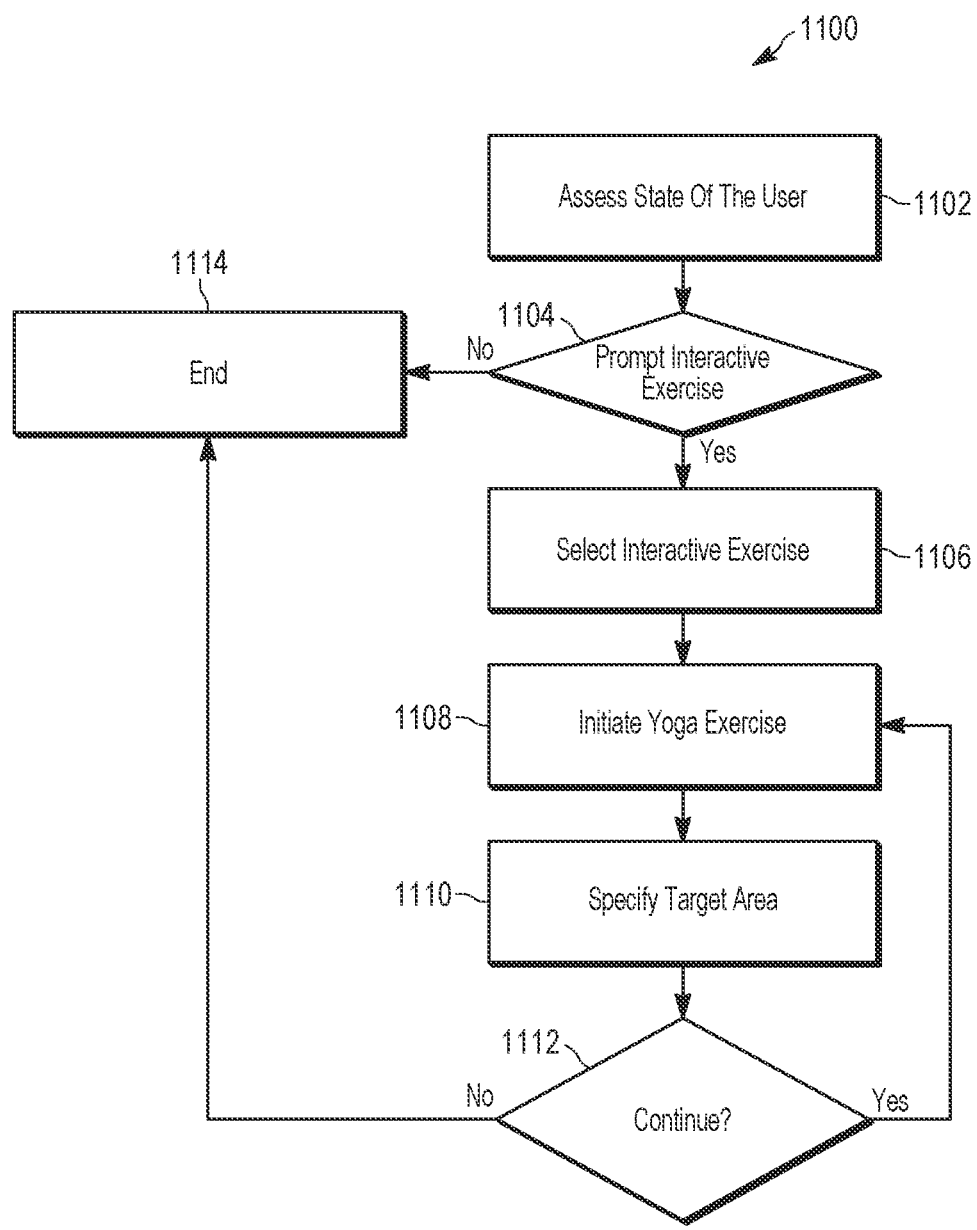
FIG. 11 is a flowchart of a method for implementing a yoga session in accordance with some embodiments.

FIG. 11 illustrates a flow chart depicting an example process 1100 implementing the yoga session using the seat 102. The yoga session can be provided as a form of treatment, as discussed with respect to FIGS. 4-6 or can be used as entertainment. Initially, the process 1100 receives inputs of biometric data and emotion recognition from the user 104. The biometric data can include biometric or physiological data as discussed herein and the emotion recognition can be derived using a camera to capture an image of the face of the user 104 and performing analysis on the captured image.

At step 1102, the process 1100 assesses the state of the user 104 (including the states previously described).

At step 1104, the process 1100 prompts the user 104 to input a selection of an interactive exercise. For example, the display 112 or user device 114 displays a selectable graphical mechanism listing available interactive exercises, including a yoga session. In some embodiments, the prompt is triggered in response to the state of the user 104. For example, if the user 104 is stress or tired, the computing environment 106 may recommend that the user 104 participate in an interactive exercise to relax. As noted previously, each of the interactive exercises are associated with one or more activities that are synchronized with one or more haptic feedback elements of the seat 102 for an interactive experience and the user 104 can select one of the interactive exercises depending on which is most appealing at a given point in time. However, in process 1100, the selected interactive exercise is a yoga session.

If the user 104 declines participating in the yoga session, the process 1100 advances to step 1114 and ends. If the user 104 accepts participating in the yoga session, the process 1100 advances to step 1106. At step 1106, the user selection is received. At step 1108, the interactive exercise for a yoga session is initiated. In some embodiments, the yoga session uses local audio and/or video to provide prompts, display information, etc. to interact with the user. For example, the yoga session can include videos showing the user 104 the poses being mimicked and providing instructions to the user 104.

In some embodiments, initially the bolster bladders initially deflate and seat B-surface bladders (seat & cushion) initially inflate. These actions provide more of a flat surface for yoga. In some embodiments, A-surface bladders are inflated in specific areas to support various poses shown in the video and to simulate breathing timing (inhale/exhale). Different yoga poses and movements can be implemented using the plurality of bladder 312. For example, for a twist, bladders are inflated on one side of the seat 102 while bladders on the opposite side of the seat 102 deflate, in coordination with video timing. In another example, bladders on the backrest 308 deflate and shoulder bladders inflate when back is rounded. In a last example, shoulder bladders deflate and lower back bladders (e.g., in backrest 308) inflate to support upright stretch poses.

During the yoga session, in some embodiments, the breathing rate and/or heart rate of the user 104 is monitored and the seat 102 is used to coach the user 104 through a variety of cues (video, auditory, contact interface, etc.) to practice breathing exercises. The cues can be provided directly from the seat 102 or the seat 102 surroundings (e.g., vehicle speakers, user device 114, etc.). In some embodiments, at least one of the haptic feedback subsystem 234, temperature subsystem 236, and the A/V feedback subsystem 238 are activated to provide the cues. In some embodiments, the process provides real-time audio and/or visual feedback to the user 104. The feedback can be real-time or pre-recorded feedback for the user (voice on yoga video) to encourage completion of the video and feedback on improving biometric signals like pulse and blood oxygen. In some embodiments, the yoga session is programmed to optimize the occupant's posture.

At step 1110, the process 1100 prompts the user 104 to specify target areas. In some embodiments, the computing environment 106 provides recommended yoga types and/or target areas based on the assessed emotional state and biometric data of the user 104. In one example, the computing environment 106 provides a graphic indicating that particular treatment is recommended.

At step 1112, the process 1100 prompts the user 104 if they would like to continue the yoga session. If the received selection is yes, the process 1100 returns to step 1108 and the yoga session continues. If the received selection is no, the process 1100 advances to step 1114. In some embodiments, when the user 104 is finished with the yoga session, additional information is displayed to the user 104. For example, fitness details such as breathing rate, total calories, average heart rate, etc. are displayed.

At steps 1114, the yoga session is stopped. As with other embodiments of interactive exercises, the result of the yoga session is measured to assess wellness and comfort of the user 104. The treatment and wellness assessment can be performed based on at least one of biometrics, visual analysis of the user 104, and subjective survey feedback from the user 104. In one example embodiment, a camera and analytics are used to determine if the interactive exercise is having a positive effect on the user 104. Similarly, physiological data can be referenced to determine if the user 104 is more or less relaxed after implementing the interactive exercise. In some embodiments, the feedback provided through these analyses is used to update the AI/machine learning (e.g., training models).

In operation, for a yoga session, a selection for one or more yoga programs is received from the user input device. The selected yoga program is initiated and a selection of the plurality of bladders 312 are deflated and another selection of the plurality of bladders 312 are inflated based on the pose being converted to the user. The computing environment 106 monitors the user's 104 progress using one or more of the pressure sensors 324 and feedback devices 110. For example, the computing environment 106 can use one or more cameras to capture an image(s) of a user and compare the user's form against a predetermined form to determine whether the user 104 is performing the pose correctly. The computing environment 106 also monitors one or more biometric signals for the user 104. For example, a breath rate and heartrate of the user 104 are monitored (e.g., using biometric feedback devices 110). Based on the measured one or more biometric signals, the computing environment 106 can provided feedback to the user 104 and/or update the yoga instructions to provide positive reinforcement, correction, etc. to the user 104.

Figure 12:
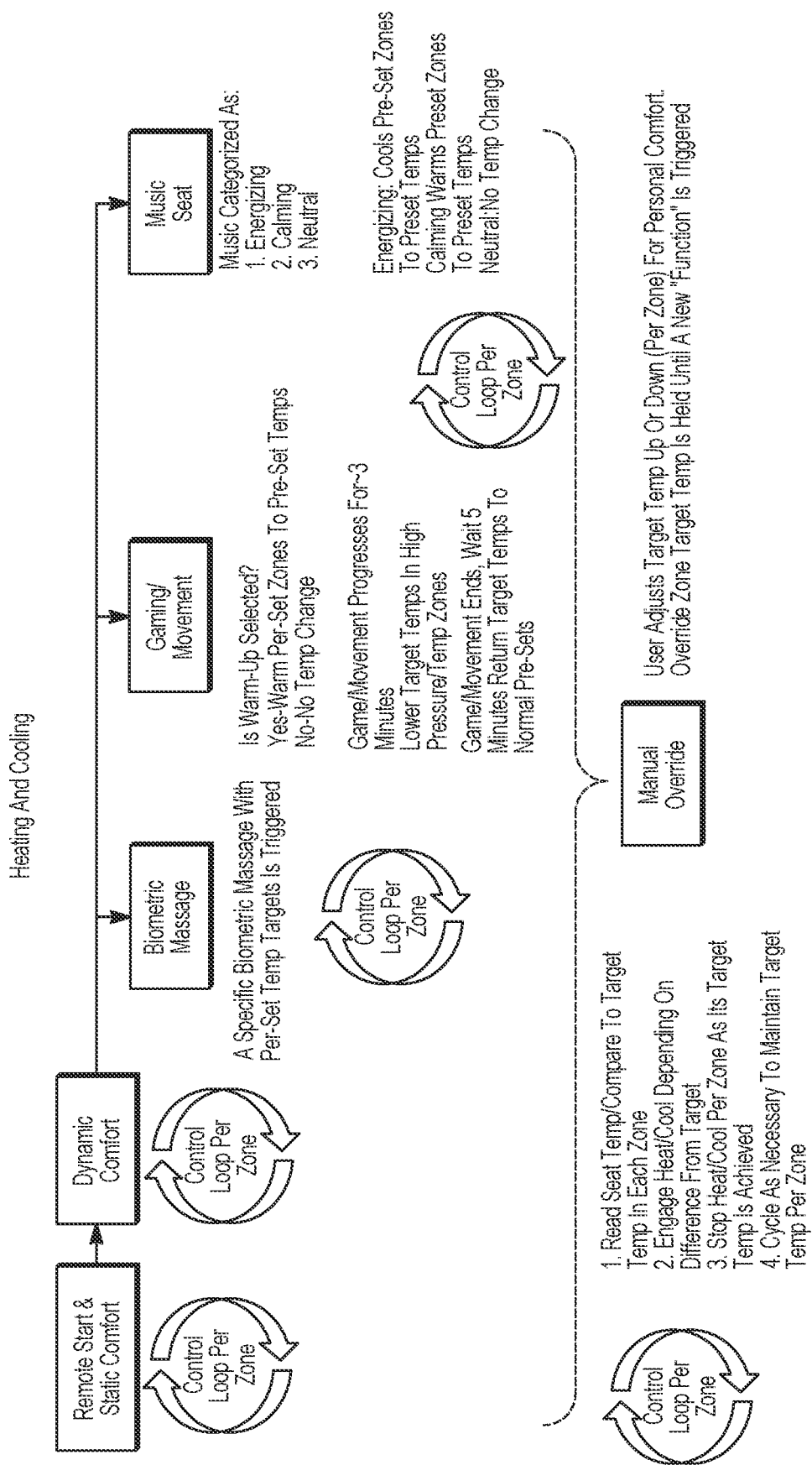
FIG. 12 illustrates a diagram for a heating and cooling method for use by the methods of FIGS. 8-11 in accordance with some embodiments.

Referring to FIG. 12, in some embodiments, the temperature subsystem 236 supplements one or more of the processes discussed with respect to FIGS. 3-11. The temperature subsystem 236 provides heating and cooling using the temperature controlling element 320 and the temperature sensing elements 322. In some embodiments, each temperature sensing element 322 controls the temperature at a specific location such that a target temperature (e.g., as set by the user 104) is achieved throughout an entirety of the seat 102. The target temperature is maintained by comparing the target temperature to the actual temperature in each zone. If the difference between the two temperatures is less than or greater than zero, the temperature controlling element 320 at that location is activated to correct the temperature.

As depicted in FIG. 12, the temperature subsystem 236 supplements other subsystems and treatment processes. The temperature subsystem 236 is configured to provide targeted, customizable heating and cooling throughout the seat 102. The heating and cooling can be provided generally or in targeted/localized areas within the seat 102. In some embodiments, the computing environment 106 provides an interface for manual control to target temperature and display the interface temperature at different areas within the seat 102, for example, as provided by the temperature sensors 322.

In some embodiments, the temperature subsystem 236 is used during remote start of a vehicle to establish the target temperature of the seat 102 prior to the user 104 occupying the seat 102. In some embodiments, the temperature subsystem 236 is used during dynamic comfort to continuously monitor the temperature of the seat 102 and adjust the temperature as needed to maintain the target temperature throughout the seat 102. In some embodiments, the temperature subsystem 236 is used to supplement the biometric massage (e.g., FIG. 6) to assist in adjusting the temperature of the seat 102 according to the biometric massage parameters. In some embodiments, the temperature subsystem 236 is used to supplement the interactive entertainment processes (e.g., FIGS. 8-11). In one example, heat is applied by the temperature controlling element 320 to warm up the user 104 prior to starting any of the activities. In another example, cooling is applied by the temperature controlling element 320 to cool off the user 104 after completing any of the activities.

Using the temperature subsystem 236 in this manner provide personal thermal comfort, enhanced physiological effects of massage, and an overall enhanced customizable seating environment.

The following are enumerated examples of the devices, systems, and methods of the subject matter described and illustrated in the foregoing specification.

Example 1: A seat comprising:
a frame;
a plurality of seat cushions;
a plurality of adjustable bladders positioned within the seat;
a plurality of sensors located within the seat;
a memory for storing user data and a plurality of seat adjustment programs for controlling the plurality of adjustable bladders; and
an electronic processor coupled to the memory, the plurality of adjustable bladders, and the plurality of sensors, the electronic processor configured to control the plurality of adjustable bladders in accordance with the seat adjustment programs and based on the user data and feedback from at least one of the plurality of sensors.

Example 2: The seat of example 1, wherein the plurality of seat cushions includes a seat base cushion, a back rest cushion, and a head rest cushion.

Example 3: The seat of examples 1 or 2, further comprising a plurality of temperature controlling elements.

Example 4: The seat of examples 1-3, further comprising a plurality of haptic feedback devices.

Example 5: The seat of examples 1-4, further comprising a plurality of tactile feedback generators.

Example 6: The seat of example 1-5, wherein the plurality of sensors includes a combination of physiological sensors, pressure sensors, and temperature sensors.

Example 7: The seat of examples 1-6, wherein the plurality of seat adjustment programs includes a static comfort module, and the electronic processor is configured to establish a seat contour.

Example 8: The seat of example 7, wherein the electronic processor is configured to
- establish, via a seat adjustment subsystem, a contour of the seat based on a user's size, shape, and personal preferences.

Example 9: The seat of example 8, wherein establishing, via a seat adjustment subsystem, a contour of the seat includes adjusting a combination of bolsters, a lumbar support, the plurality of adjustable bladders, a seat recline, a seat height, and a seat angle.

Example 10: The seat of example 7, wherein the electronic processor is configured to assess a pressure between a user and the seat.

Example 11: The seat of example 10, where the electronic processor is configured to determine a total load measured by a plurality of pressure sensors prior to assessing the pressure between the user and the seat.

Example 12: The seat of example 7, wherein the plurality of sensors includes a plurality of pressure sensors located at a plurality of locations and wherein the electronic processor is configured to generate a map of pressure values based on pressures sensed by the plurality of pressure sensors.

Example 13: The seat of example 12, wherein the map of pressure values is stored in a user profile.

Example 14: The seat of example 12, wherein the pressure values are overlayed into a pressure grid representing regional body mapping zones of a human body model.

Example 15: The seat of example 7, wherein the electronic processor is configured to
- control a pressure scan of the seat to establish an initial baseline pressure; and
- establish, via a seat adjustment subsystem, an initial contoured static comfort configuration of the seat.

Example 16: A method of operating a seat, the method comprising:
- assessing, via a plurality of pressure sensors, a pressure between a user and a seat;
- configuring, via an electronic processor, pressure data from the plurality of pressure sensors to represent physical locations;
- generating, via the electronic processor, a grid of pressure values from the pressure data;
- scaling, via the electronic processor, the pressure values to a human body model to the user to create a scaled human body model;
- aligning, via the electronic processor, the pressure values within regional groups of the human body model;
- determining, via the electronic processor, body segment pressures of the user;
- analyzing, via the electronic processor, left and right side pressure values of the scaled human body model to determine whether left and right side pressure values are similar within a predetermined threshold;
- when the left and right side pressure values are similar within the predetermined threshold, averaging the left and right side pressure values;
- comparing measured pressure values to target pressure values to determine a measured-to-target pressure difference;
- when the measured-to-target pressure difference exceeds a predetermined threshold, performing, via the electronic processor, a seat adjustment;
- when the measured-to-target pressure difference does not exceed a predetermined threshold, store a current seat contour in a user profile.

Example 17: The method of example 16, further comprising populating the user profile with data entered by the user.

Example 18: The method of examples 16 or 17, further comprising
- when the left and right side pressure value are not similar within the predetermined threshold, determining whether a difference in the left and right side pressure values can be accounted for based on predetermined factors;
- when the difference in the left and right side pressure values can be accounted for, determining an equalization pressure.

Example 19: The method of examples 16-18, wherein performing, via the electronic processor, a seat adjustment includes controlling the seat adjustment subsystem.

Example 20: The method of examples 16-19, further comprising evaluating the seat adjustment after a predetermined period of time.

Example 21: The method of examples 16-20, further comprising displaying a user prompt on a display device and processing a response to the user prompt prior to prior to performing, via the electronic processor, the seat adjustment.

Example 22: A method of operating a seat that includes a plurality of adjustable bladders positioned within the seat; a plurality of sensors located within the seat; a memory for storing user data and a seat adjustment program for controlling the plurality of adjustable bladders; and an electronic processor coupled to the memory, the plurality of adjustable bladders, and the plurality of sensors, the electronic processor configured to control the plurality of adjustable bladders in accordance with the seat adjustment program and based on the user data and feedback from at least one of the plurality of sensors, the method comprising:
- adjusting, via the electronic processor and a seat adjustment subsystem, the seat;
- monitoring, via the electronic processor and a combination of the plurality of pressure sensors and a physiological sensor subsystem, a state of a user;
- configuring user preferences;
- performing a pressure scan of the seat to establish an initial baseline pressure;
- receiving, via the seat and the plurality of pressure sensors, physical input from the user;
- determining whether the user is applying sustained pressure to a first area of the seat;
- in response to determining that the user is applying sustained pressure to the first area of the seat, reducing a firmness of the first area of the seat;
- determining whether the user is applying less pressure to the first area of the seat;
- in response to determining that the user is applying less pressure to the first area of the seat, increasing a firmness of the area of the seat.

Example 23: The method of example 22, further comprising adjusting a firmness of a second area of the seat that is adjacent to the first area of the seat.

Example 24: The method of examples 22 or 23, further comprising determining whether additional adjustments to the seat are required.

Example 25: The method of examples 22-24, further comprising monitoring a comfort state of the user.

Example 26: The method of example 25, wherein the comfort state of the user is determined, via the electronic processor, based on a combination of time, seat pressure, seat temperature, and biometric information.

Example 27: The method of example 22, further comprising determining, via the electronic and a physiological subsystem, an emotional state of the user.

Example 28: The method of example 22, further comprising determining, via the electronic processor and the plurality of pressure sensors, a user seat pressure.

Example 29: The method of example 28, further comprising determining, via the electronic processor, an asymmetric pressure distribution.

Example 30: The method of example 22, further comprising determining, via the electronic processor and the plurality of pressure sensors, a posture change of the user.

Example 31: The method of example 22, further comprising determining, via the electronic processor and the plurality of pressure sensors, a regional pressure increase by the user.

Example 32: The method of example 22, further comprising determining, via the electronic processor and the plurality of pressure sensors, high pressure points on the user.

Example 33: The method of example 22, further comprising determining, via the electronic processor and the plurality of pressure sensors, detecting fidgeting of the user.

Example 34: The method of example 22, further comprising prompting, via the electronic processor and an output device, the user to indicate whether the user would like to change the seat contour.

Example 35: The method of example 34, further comprising
  receiving, via an input device and the electronic processor, an indication that the user would like the seat contour to be changed; and
  initiating automatic contouring of the seat.

Example 36: The method of example 35, wherein automatic contouring includes at least one selected from the group consisting of changing an inflation of at least one of the plurality of bladders, changing a position of the seat, changing a position of a seat base of the seat, changing a position of a backrest of the seat, changing a position of a lumbar support, and changing a position of a headrest of the seat.

Example 37: The method of example 22, further comprising performing, via the electronic processor and a seat adjustment subsystem, automatic contouring of the seat based on a user profile.

Example 38: The method of example 22, further comprising
  providing, via the electronic processor and an output device, a user prompt to initiate interactive seat contouring;
  receiving, via an input device and the electronic processor, a selection to initiate the interactive seat contouring in response to the user prompt.

Example 39: The method of example 22, further comprising
  determining, via the electronic processor and the plurality of pressure sensors, whether discomfort condition exists; and
  in response to determining the discomfort condition exists, recommending a treatment to the user.

Example 40: The method of example 22, wherein the seat includes a plurality of tactile feedback devices.

Example 41: The method of example 40, wherein the treatment includes one selected from the group consisting of adjusting a seat contour, a pneumatic massage, a vibration massage, a music massage, a biometric massage, a heartrate-based stress relief, an interactive exercise, yoga, and a temperature treatment.

Example 42: The method of example 41, further comprising
  receiving, via an input device and the electronic processor, a selection of the treatment;
  performing, via the electronic processor and a seat adjustment system, the treatment.

Example 43: The method of example 42, further comprising recording the discomfort condition and treatment in a user profile.

Example 44: The method of example 42, further comprising measuring, via feedback devices and the electronic processor, a result of the treatment.

Example 45: A method of operating a seat that includes a plurality of adjustable bladders positioned within the seat; a plurality of sensors located within the seat; a memory for storing user data and a seat adjustment program for controlling the plurality of adjustable bladders; and an electronic processor coupled to the memory, the plurality of adjustable bladders, and the plurality of sensors, the electronic processor configured to control the plurality of adjustable bladders in accordance with the seat adjustment program and based on the user data and feedback from at least one of the plurality of sensors, the method comprising:
  receiving, via a plurality of feedback devices and the electronic processor, biometric signals about the user;
  analyzing, via the electronic processor, the biometric signals to determine a state of the user;
  determining, via the electronic processor, whether the user is in a negative state;
  in response to determining that the user is in a negative state, performing a biometric massage.

Example 46: The method of example 45, further comprising obtaining a biometric signal sample.

Example 47: The method of example 46, wherein the biometric signal sample includes signals related to breathing of the user or heartrate of the user.

Example 48: The method of example 46, further comprising filtering the biometric signal sample.

Example 49: The method of example 48, further comprising modifying a speed of the biometric signal sample to create a modified biometric signal sample.

Example 50: The method of example 48, further comprising activating, via the electronic processor, at least one of a haptic feedback subsystem, a temperature subsystem, and an A/V feedback subsystem to mimic the modified biometric signal sample and to perform a biometric treatment.

Example 51: The method of example 50, further comprising activating, via the electronic processor, at least one of a haptic feedback subsystem, a temperature subsystem, and an A/V feedback subsystem to supplement the mimicked modified biometric signal sample.

Example 52: The method of example 50, further comprising determining, via the plurality of feedback devices and the electronic processor, whether the user is still in a negative state.

Example 53: The method of example 50, further comprising assessing, via the plurality of feedback devices and the electronic processor, a success of the biometric treatment by comparing biometric signals measured before, during, and after performance of the treatment to target data.

Example 54: The method of examples 52 or 53, further comprising further modifying the modified biometric signal sample.

Example 55: The method of examples 52 or 53, further comprising providing, via an output device and the electronic processor, a user prompt to stop, continue, or select a different type of treatment.

Example 56: The method of example 50, further comprising assessing, via a camera and the electronic processor, an effect of a treatment on a user.

Example 57. A method of operating a seat that includes a physiological sensor subsystem; a haptic feedback subsystem; a memory for storing user data and a seat adjustment program; and an electronic processor coupled to the memory, the physiological sensor subsystem; and the haptic feedback subsystem, the electronic processor configured to control the haptic feedback subsystem in accordance with the seat adjustment program, the method comprising:
- receiving, via the physiological sensor subsystem and the electronic processor, biometric data for a user;
- receiving, via the memory and the electronic processor; data from a user profile;
- determining a first heartrate value based on the biometric data;
- comparing, via the electronic processor, the first heart rate value, against a standard heartrate value for the user;
- determining whether the first heart rate value and the standard heartrate value are similar within a predetermined threshold;
- in response to determining that the first heart rate value and the standard heartrate value are not similar,
  - determining a posture of the user is checked;
  - performing a Fourier transform on the first heartrate value to generate a first transform of the first heartrate value;
  - determining a first low frequency value of the first transform;
  - determining a first high frequency value of the first transform;
  - determining a ratio of the first low frequency value and the first high frequency value; and
  - performing, via the electronic processor and the haptic feedback subsystem, a treatment.

Example 58: The method of example 57, determining whether the ratio of the low frequency value exceeds a predetermined value and wherein performing the treatment occurs only when the ration exceeds the predetermined value.

Example 59: The method of examples 57 or 58, further comprising performing a Fourier transform on the second first heartrate value to generate a second transform of the second heartrate value.

Example 60: The method of example 59, further comprising
- determining a second low frequency value of the second transform;
- determining a second high frequency value of the second transform; and
- determining a ratio of the second low frequency value and the second high frequency value.

Example 61: The method of example 60, further comprising comparing the ratio of the first low frequency value and the first high frequency value and the ratio of the second low frequency value and the second high frequency value.

Example 62: The method of example 61, further comprising in response to determining that the ratio of the first low frequency value and first high frequency value and the ratio of the second low frequency value and the second high frequency value are dissimilar by a predetermined amount, displaying, via a display device and the electronic processor, an indication of a change in user's emotional state.

Example 63: The method of example 62, further comprising displaying, via the display device and the electronic processor, a user prompt to start a new treatment, to continue the treatment, or end the treatment.

Example 64: A method of operating a seat for a user of the seat, wherein the seat includes a haptic feedback subsystem; a memory for storing user data and a seat adjustment program; and an electronic processor coupled to the memory, the physiological sensor subsystem; and the haptic feedback subsystem, the electronic processor configured to control the haptic feedback subsystem in accordance with the seat adjustment program, the method comprising:
- receiving, via the physiological sensor subsystem and the electronic processor, biometric data for the user;
- determining, via the electronic processor, a state of the user;
- in response to determining the state of the user, prompting, via an output device and the electronic processor, the user to initiate a music-based massage;
- prompting, via the output device and the electronic processor, the user to select a mode associated with music having a music signal;
- activate the haptic feedback system in accordance with the selected mode in sync with the music to provide a music-based massage; and
- prompting, via the output device and the electronic processor, the user to select whether the music-based massage should continue with different music.

Example 65: The method of example 64, further comprising assessing, via a camera and the electronic processor, an effect of the music-based massage on the user.

Example 66: The method of example 64, further comprising assessing, via the physiological sensor subsystem and the electronic processor, an effect of the music-based massage on the user.

Example 67: The method of example 64, further comprising filtering the music signal prior to activating the haptic feedback system.

Example 68: A method of operating a seat that is configured to support a user and that includes a physiological sensor subsystem; a haptic feedback subsystem; a plurality of sensors, a memory for storing user data and a seat adjustment program; and an electronic processor coupled to the memory, the physiological sensor subsystem; and the haptic feedback subsystem, the electronic processor configured to control the haptic feedback subsystem in accordance with the seat adjustment program, the method comprising:
- receiving, via the physiological sensor subsystem and the electronic processor, biometric data for the user;
- determining, via the electronic processor, a state of the user;
- in response to determining the state of the user, prompting, via an output device and the electronic processor, the user to initiate an interactive exercise;
- providing, via the output device and the electronic processor, a prompt with available interactive exercises for selection;
- activate the haptic feedback system in accordance with the selected interactive exercise; and
- prompting, via the output device and the electronic processor, the user to select whether the music-based massage should continue with different music.
- activating, via the haptic feedback system and the electronic processor, the interactive exercise;

determining, via the plurality of sensors and the electronic processors, whether movements of the user matches sequence provided by the seat in accordance with the interactive exercise; and when the movements of the user do not match sequences provided by the seat, outputting an indication of that the movements do not match the sequence.

Example 69: The method of example 68, further comprising when the movements of the user match sequences provided by the seat outputting a celebratory graphic.

Example 70: The method of example 68, further comprising prompting, via the output device and the electronic processor, the user to select whether the interactive exercise should continue.

Example 71: The method of example 68, further comprising outputting, via the output device and the electronic processor, a player score.

Example 72: The method of example 68, further comprising assessing, via a camera and the electronic processor, an effect of the interactive exercise on the user.

Example 73: The method of example 68, further comprising assessing, via the physiological sensor subsystem and the electronic processor, an effect of the interactive exercise on the user.

Example 74: The method of example 68, wherein the interactive exercise is a dance simulator.

Example 75: The method of example 68, further comprising
determining, via the physiological sensor subsystem and the electronic processor, a heart rate of the user; and
determining a difficulty level of the interactive exercise based on the heart rate.

Example 76: The method of example 68, wherein the interactive exercise is a game.

Example 77: The method of example 76, further comprising selecting a song for gameplay.

Example 78: The method of example 77, further comprising
determining, via the physiological sensor subsystem and the electronic processor, a heart rate of the user; and
determining a song for gameplay based on the heart rate Example 79: The method of example 76, further comprising displaying a pattern of shapes during gameplay.

Example 80: The method of example 79, further comprising determining, via the plurality of sensors and the electronic processors, whether movements of the user match the pattern of shapes during gameplay.

Example 81: The method of example 80, further comprising displaying a progress bar.

Example 82: The seat of any of examples 1-16 further comprising a temperature subsystem.

Example 83: A method of any of examples 16-81 wherein the seat comprises a temperature subsystem.

Example 84: The method of example 83, further comprising
determining a temperature of the seat via a temperature sensor; and
adjusting a temperature of the seat via the temperature subsystem.

Example 85: A seat comprising:
a frame;
a plurality of seat cushions;
a seat adjustment subsystem,
a plurality of sensors located within the seat;
a memory for storing user data and a seat adjustment program; and
an electronic processor coupled to the memory, the seat adjustment system, and the plurality of sensors, the electronic processor configured to control the seat adjustment system in accordance with the seat adjustment program and based on the user data and feedback from at least one of the plurality of sensors.

Example 86: The seat of example 85, further comprising a physiological sensor subsystem.

Example 87: The seat of examples 85 or 86, further comprising a haptic feedback subsystem.

Example 88: The seat of examples 85-87, further comprising a temperature subsystem.

Example 89: The seat of examples 85-88, further comprising an audio/visual (A/V) feedback subsystem.

Example 90: A seat comprising:
a frame;
a plurality of seat cushions;
a haptic feedback subsystem,
a plurality of sensors located within the seat;
a memory for storing user data and a seat adjustment program; and
an electronic processor coupled to the memory, the haptic feedback subsystem, and the plurality of sensors, the electronic processor configured to control the haptic feedback subsystem in accordance with the seat adjustment program and based on the user data and feedback from at least one of the plurality of sensors.

Example 91: The seat of example 90, further comprising a physiological sensor subsystem.

Example 92: The seat of examples 90 or 91, further comprising a seat adjustment subsystem.

Example 93: The seat of examples 90-92, further comprising a temperature subsystem 236.

Example 94: The seat of examples 90-93, further comprising an audio/visual (A/V) feedback subsystem.

Example 95: A method for automatic seat adjustment according to the processes discussed herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A seat comprising:
a frame;
a plurality of seat cushions;
a plurality of adjustable bladders positioned within the seat;
a plurality of sensors located within the seat;
a plurality of voice coils located within the seat, wherein each voice coil is associated on a one-to-one basis with an adjustable bladder of the plurality of adjustable bladders;
a memory for storing user data and a plurality of seat adjustment programs for controlling the plurality of adjustable bladders and the plurality of voice coils; and
an electronic processor coupled to the memory, the plurality of adjustable bladders, the plurality of voice coils, and the plurality of sensors, the electronic processor configured to control the plurality of adjustable bladders and the plurality of voice coils in accordance with the seat adjustment programs and based on the user data and feedback from at least one of the plurality of sensors;
wherein the plurality of adjustable bladders, the plurality of voice coils, or both the plurality of adjustable bladders and the plurality of voice coils is configured to provide a massaging output.

2. The seat of claim 1, wherein the plurality of seat cushions includes a seat base cushion, a back rest cushion, and a head rest cushion.

3. The seat of claim 1, further comprising a plurality of temperature controlling elements configured to supplement the massaging output by adjusting a temperature of the seat according to massage parameters.

4. The seat of claim 3, wherein the plurality of temperature controlling elements is configured to provide heat to warm a user of the seat prior to the user beginning an activity associated with the massaging output.

5. The seat of claim 3, wherein the plurality of temperature controlling elements is configured to cool a user of the seat after the user completing an activity associated with the massaging output.

6. The seat of claim 1, wherein the plurality of sensors includes a physiological sensor configured to measure a biometric signal that includes at least one of a group consisting of heart rate, heart rate variability (HRV), breathing rate, and combinations thereof; and
wherein the massaging output includes a biometric massage treatment configured to mimic the biometric signal and then be modified to be output according to a modified biometric signal that is adjusted based on a state of a user as determined based on the biometric signal.

7. The seat of claim 1, wherein the plurality of seat adjustment programs includes a static comfort module, and the electronic processor is configured to establish a seat contour.

8. The seat of claim 7, wherein the electronic processor is configured to
establish, via a seat adjustment subsystem, a contour of the seat based on a user's size, shape, and personal preferences.

9. The seat of claim 8, wherein establishing, via a seat adjustment subsystem, a contour of the seat includes adjusting a combination of bolsters, a lumbar support, the plurality of adjustable bladders, a seat recline, a seat height, and a seat angle.

10. The seat of claim 7, wherein the electronic processor is configured to assess a pressure between a user and the seat.

11. The seat of claim 10, where the electronic processor is configured to determine a total load measured by a plurality of pressure sensors prior to assessing the pressure between the user and the seat.

12. The seat of claim 7, wherein the plurality of sensors includes a plurality of pressure sensors located at a plurality of locations and wherein the electronic processor is configured to generate a map of pressure values based on pressures sensed by the plurality of pressure sensors.

13. The seat of claim 12, wherein the map of pressure values is stored in a user profile.

14. The seat of claim 12, wherein the pressure values are overlayed into a pressure grid representing regional body mapping zones of a human body model.

15. The seat of claim 7, wherein the electronic processor is configured to
control a pressure scan of the seat to establish an initial baseline pressure; and
establish, via a seat adjustment subsystem, an initial contoured static comfort configuration of the seat.

* * * * *